United States Patent [19]
Hayward

[11] Patent Number: 6,116,844
[45] Date of Patent: Sep. 12, 2000

[54] MECHANISMS FOR ORIENTING AND PLACING ARTICLES

[75] Inventor: Vincent Hayward, Montreal, Canada

[73] Assignees: McGill University; The Canadian Space Agency, both of Canada

[21] Appl. No.: 08/632,497

[22] PCT Filed: Oct. 26, 1994

[86] PCT No.: PCT/CA94/00583

§ 371 Date: May 9, 1996

§ 102(e) Date: May 9, 1996

[87] PCT Pub. No.: WO95/11780

PCT Pub. Date: May 4, 1995

[30] Foreign Application Priority Data

Oct. 26, 1993 [CA] Canada ................................. 2109276
Apr. 15, 1994 [CA] Canada ................................. 2121396

[51] Int. Cl.[7] ......................................................... B25J 9/06
[52] U.S. Cl. .............................................. 414/680; 901/15
[58] Field of Search .................................. 414/680, 728; 901/15, 28

[56] References Cited

U.S. PATENT DOCUMENTS

| | | | |
|---|---|---|---|
| 4,329,111 | 5/1982 | Schmid ................................. | 901/15 X |
| 4,730,975 | 3/1988 | Munakata ............................. | 901/15 X |
| 4,756,662 | 7/1988 | Tanie et al. .......................... | 901/15 X |
| 5,129,279 | 7/1992 | Rennex ................................. | 901/15 X |
| 5,219,266 | 6/1993 | Reboulet et al. ...................... | 414/733 |
| 5,271,290 | 12/1993 | Fischer ................................. | 901/15 X |
| 5,562,012 | 10/1996 | Nishi et al. .......................... | 901/15 X |
| 5,673,595 | 10/1997 | Hui et al. ............................. | 901/15 X |

FOREIGN PATENT DOCUMENTS

| | | | |
|---|---|---|---|
| 1407793 | 7/1988 | U.S.S.R. ............................. | 901/15 |

OTHER PUBLICATIONS

"Borrowing Some Ideas From Biological Manipulators to Design an Artificial One"—Vincent Hayward in "Robots and Biological Systems" Nato Series R. Dario (EDS) Springer Verlag pp135–148, 1991.

Primary Examiner—Janice L. Krizek
Attorney, Agent, or Firm—David J. French

[57] ABSTRACT

A mechanism for orienting an end member utilizes paired five-bar linkages wherein two joints on each five-bar linkage may be actuated. Preferably the actuators are mounted at the base-link of the five bar linkages, such base-links being collinearly aligned. Two or three rotational and one translational degrees of freedom are available. This mechanism in its three or two degrees of rotational freedom variants has exceptional motion range, free of singularities, superior structural properties, and is easy to manufacture. This orienting mechanism can be mounted as an end member on a positioning mechanism having four main links herein three joints are actuated. The diagonally oppose joints of the positioning mechanism are respectively spherical and revolute. This positioning mechanism can operate with two actuators that are grounded and one that is elevated. In all cases sensors may be substituted for, or used in conjunction with, actuators to provide an apparatus useful, interalia, in the telerobotics and virtual reality fields.

14 Claims, 15 Drawing Sheets

MECHANISMS FOR ORIENTING AND PLACING ARTICLES

FIELD OF THE INVENTION

This invention relates to the field of mechanisms and particularly to mechanisms suited for use in the field of robotics. The described mechanisms are not, however, limited to that field but are suited to applications wherever an article is to be oriented or displaced within a given workspace. The described mechanisms can also be used as sensors to detect both rotational and translational motions.

BACKGROUND TO THE INVENTION

Mechanisms are mechanical structures synthesized with assemblages of joints and links designed to provide them with predictable structural, kinematic and dynamic properties. They are the basis for vast numbers of applications including cars, aircraft, optical instruments, manipulation devices, etc. and as such are particularly important elements of most technological systems.

Mechanisms are synthesized by constraining joints or articulations to fixed relationships by means of links. A kinematic analysis assumes links to be ideally rigid. Most mechanisms can be described by selecting one output link and one ground link and defining the elements therebetween.

Parallel mechanisms, a vast sub-class of all mechanisms, offer an opportunity for improved structural properties with rigidity, light weight and improved dynamic properties. Parallel mechanisms used in drives allow actuators to be placed at locations where they contribute the least to an increase of inertia. Further, improved accuracy can be achieved by eliminating the accumulation of errors.

Unfortunately, most known parallel mechanisms with more than two or three degrees of freedom suffer from a reduced usable workspace. The invention reported herein achieves a significant improvement in this area.

If a chain of links and joints forms loops, then the mechanism is termed parallel. If a mechanism requires exact geometrical properties to possess mobility (degrees of freedom), it is termed over-constrained. If a mechanism has no mobility, it is called a 'structure'. (The term 'structure' may apply to other notions but should be clear by context). If there are no loops the mechanism is called serial.

As joints play a central role in mechanisms and are needed to describe the invention, they are defined herein. The joints needed to describe the invention belong to the class of lower pairs because they can be defined by specifying certain pairs of surfaces which have the property of allowing relative motion without the surface contact being lost. Two surfaces of revolution form the revolute joint which has one angular degree of freedom. Two cylindrical surfaces define the cylindrical joint which has two degrees of freedom, one angular about the axis of the cylinder and one translational along the same axis. Two surfaces shaped as parallel prisms form the prismatic joint which has one freedom of translational motion. The modes of realization of these basic joints include a variety of techniques, e.g. rolling elements of locally deforming members, but these do not change the definition.

A "universal" joint is composed of two non-collinear, preferably orthogonal revolute joints with a center of rotation at the intersection of their axes.

The spherical joint has three degrees of angular freedom of motion. A spherical joint may be composed of spherical surfaces in contact, vis, a ball-in-socket; or can be created by three orthogonal revolute joints with a center of rotation at the intersection of their axes.

A "gimbal" joint has three revolute joints positioned to rotate about a common center of rotation.

Actuated joints are equipped to provide mechanical power derived from an external source. Passive joints are left free to move by virtue of the forces present in the links. Joints may be actuated to provide rotational or translational motion.

Any joint can be instrumented with sensors to measure position or velocity of the relative motion of links. Mechanisms can, therefore, be reversed in their functions. Rather than controlling a driven link through actuators placed at joints, the actuators may be replaced by sensors which detect the position and/or orientation of the former "driven" but now "sensing" link. In such cases it is particularly important for the mechanism to have reduced inertia in order to permit it to track higher frequency oscillations to which the sensing link may be exposed. Mechanisms which are both instrumented and actuated are amenable to feedback control as applied to most drive systems.

As a further variant on the application of such mechanisms, actuators may be replaced by locking devices such as "brakes". In this configuration, a mechanism can be positioned to provide support as a jig, and then become locked in place. In such application, it is desirable for the locked mechanism to remain precisely positioned after being locked.

Four bar mechanisms having four links and four joints are used in a bewildering number of applications. Many functions can be accomplished by changing the four kinematic design parameters (link lengths). If the axes of joints are not exactly parallel, the "mechanism" becomes a structure with rare exceptions.

In a four-bar planar mechanism, if one link is grounded as a "base" link, then the link opposite the ground link—the output or driven link—can be displaced along a curve in a plane through the manipulation of the links proximate to the base link—the "proximal" links. The driven link may carry an object or a further mechanism, such as a claw, tool or "end effector".

A five-bar mechanism has five links and five joints. If one link is grounded as a "base" link, then the joint opposite the grounded link—the "driven joint"—can be displaced in a plane through the manipulation of the links proximate to the base link—the "proximal" links. The remaining two links next to the driven joint may be classified as "distal links".

PRIOR ART

Two background papers of interest to the present invention are:

Pierrot F., Dombre, E. 1991. "Parallel Structures for Robot Wrists". In Advances in Robot Kinematics. Stifter, S., Lenarcic (eds.). Sprinter-Verlag. pp. 476–484; and Inoue, H., Tsukasa, Y., Fukuizumi, T. 1986. "Parallel Manipulator." In The Third International Symposium on Robotics Research. Faugeras, O. E., Giralt, G. (eds). MIT Press. pp. 321–327.

The Pierrot/Dombre paper describes a series of parallel structures commencing with the basic Stewart platform. One structure, "P4" in this paper, introduces a constraint for the upper platform which includes a universal and prismatic joint. In this P4 structure, three symmetrically placed, two-link supports extend between the lower and upper platforms. The joints for these supports are variously spherical and universal and actuation is effected through rotary actuators. In the Inoue/Fukuizumi paper an upper platform is supported by three symmetrically placed 5-bar linkages called "pantograph" links in the paper. The upper platform is otherwise unconstrained and actuation is effected through rotary actuators.

While both provide interesting designs, these papers do not suggest the configuration proposed herein to provide a "wrist" type orienting mechanism of the type hereinafter described.

A patent of interest is U.S. Pat. No. 5,219,266 issued Jun. 15, 1993 on an invention by Claude Reboulet and Claude Lambert. This references three five bar linkages constrained to elevate a platform so that it can be laterally displaced at a predetermined altitude.

A further reference prepared by the present inventor is an article—Borrowing some Ideas from Biological Manipulators to Design an Artificial One—published in "Robots and Biological systems", Nato Series, R. Dario, P. Aebisher and G. Sandini (Eds.), Springer verlag pp 139–151. (1993). FIG. 12 of this reference depicts a platform type mechanism with the platform constrained to rotate around a central spherical joint and actuated by four piston type actuators attached at both ends by spherical joints.

While the text of this reference refers to this arrangement as having a useful range of motion, with no self-interference, the fact that all joints are depicted as spherical, and that multiple links are attached to such joints means that a proper mechanism, with the capacity for structural integrity, has not been described. Accordingly, this reference does not suggest the invention hereinafter disclosed.

The present invention addresses the need for providing an advantageous dual-five bar mechanism to effect, or track, rotational motion in two or three degrees of rotational freedom plus one optional degree of translational motion. This dual-five bar mechanism can be combined advantageously with a linkage that serves as a positional mechanism and provides further degrees of translational freedom.

This simple positional mechanism can perform either as an actuated or sensing device in its own right. It employs a parallel arrangement that is akin to that of the forearm of a human. In doing so, it benefits from the intrinsic characteristics of a parallel mechanism.

That invention in its general form will now first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

"Orienting Mechanism"

This invention relates to an orienting assembly for effecting the rotational displacement about a fixed point of an end member supported by a rotational support joint having two or three degrees of rotational freedom that is carried to a base. Additionally, translational displacements of the end member from that fixed point may also be effected by provision of a cylindrical joint which is located in the path of the support provided to the end member by the rotational support joint. This includes, for example, locating the cylindrical joint between the end member and the support joint within the support joint, or between the support joint and the base.

In order to control the orientation of the manipulated end member with either two or three degrees of rotational freedom, two, paired "5-bar" linkage assemblies are employed, each equipped with actuators. The 5-bar linkages are each supported by a revolute joint connected between the base link of the 5-bar assembly the base of which serves as a "ground". The opposed, "driven" joint of each 5-bar linkage is coupled by universal or spherical joints to the end member which is to be oriented. The actuators employed may either be translational or rotary.

In one variant of the invention employing rotary actuation this mechanism relies upon two pairs of rotational actuators positioned at two of the joints of each 5-bar linkage. Preferably the rotary actuators are positioned at the two joints located at the ends of the base link that connect to the two "proximal" links. In another variant of the invention, linear actuators are placed between the ends of the base link and the driven joint in each 5-bar linkage. In both cases, actuation means are used to control the position of the driven joint with respect to the base link, and thereby the orientation of the end member.

In the case of the use of linear actuators these elements may only be positioned between the proximal links and the "distal" links which join the proximal links to the driven joint.

The driven joint of the 5-bar linkage, opposite the base link, may be connected to the end member through either a universal or spherical joint. If this joint is universal, then the end member may be manipulated by the actuator to effect pitch and yaw motions. If the connecting joints between the driven joint and end member are spherical, then roll motions may also be achieved. All these rotations occur within a large workspace due to limited interference from the 5-bar linkages.

In the case where couplings between the driven joints of each 5-bar assembly and the end member are universal, providing only two rotational degrees of freedom, then the mechanism in this degenerate form will still function usefully as a "pointing" mechanism. Applications for such a device include supporting microwave antennae, telescopes and directional laser mounts, rocket engines and boring heads.

When the support joint for the end member has only two degrees of rotational freedom then the end member may only be pointed.

In either case, an advantage of this configuration is that the full weight of the pointed element is carried by the pivotal mount at the center of rotation of the rotational joint supporting the end member. Thus the actuators associated with the 5-bar linkages never need to carry any of the load of the apparatus which is being oriented.

In the rotary variant of the invention where three degrees of rotational freedom are desired, four rotational actuators are preferably provided. These are preferably mounted, in pairs, at the ends of the base link of the respective 5-bar linkages, just above the grounded revolute joint to apply a positioning force between their respective proximal linkages and the base link. This may be effected by employing a common shaft for the revolute joints which these proximal links then share.

The mechanism is inherently light and has low inertia. Rotational positioning may be provided by tendons. The mechanism may be utilized in either input or output mode and may be inverted. In telerobotic applications it will provide a high band-width level of sensory feed-back to an operator.

More generally, the invention may be described as an actuable mechanism for orienting an end member with respect to a base, the end member being constrained by a support joint with is grounded to the base, such support joint having two or three rotational degrees of freedom and a center of rotation for said two or three of said degrees of rotational freedom, such mechanism comprising two 5-bar linkages each defining a closed loop and having:

(a) a base link with two ends, such base link being connected to the base through a revolute joint;
(b) first and second proximal links connected respectively to the ends of the base link;
(c) a driven joint positioned opposite to said base link and joined thereto by first and second distal links which are respectively coupled through said proximal links to said base link; and
(d) first and second actuated joints positioned within said closed loop between said base link and said driven joint for displacing the driven joint with respect to the base link, wherein the driven joints of each of said 5-bar linkages are each respectively connected to the end member at connection points through twinned joints which are either twinned spherical joints or twinned universal joints, being twinned with respect to the two distal links, said connection points being non-coincident with the center of rotation for the support joint, thereby to provide mobility to the end member with respect to said base in response to said actuators. A twinned universal joint is defined as a single universal joint with an additional third joint mounted co-axially on an extension to the axle of one of the original joints, thus adding a coupling for another link having two degrees of rotational freedom.

The mechanism of the invention may have first and second actuated joints within each 5-bar linkage which are rotational joints, positioned respectively between the ends of the base link and the driven joint. More preferably, such first and second actuated rotational joints are positioned respectively at the ends of the base link, between such ends and the respective proximal links.

Alternately, a mechanism of the invention may have first and second actuated joints which are sliding joints, positioned respectively between the proximal and distal links.

If the rotational freedom of the end member is to be limited to that suited for a pointing mechanism, the twinned universal joints in each 5-bar linkage may comprise three revolute joints, the first and second of which joints having coinciding axes and being connected to the distal links; the third of such joints being positioned between the first and second joints and the end member, all of said joints having a common center of rotation. In the fully spherical embodiment, the twinned spherical joints respectively connecting the dual 5-bar linkages to the end member may each comprise four revolute joints, the first and second of which are respectively connected to distal links and have coinciding axes, all of the axes of said joints having a common center of rotation.

As an additional option, the mechanism of the invention may further incorporate a cylindrical joint positioned between the end member and the base, in the path carrying the support provided by the support joint as, for example, within the support joint, to permit the end member to be translationally displaced with respect to the center of rotation for the end member.

Some of the features of the embodiments of the invention may be summarized as follows:

(1) The mechanism of the present invention may have four degrees of freedom: three in angular motions and one in translational motion. If the translational motion is not used it reduces to a spherical mechanism. If one selected rotational degree of freedom is suppressed, it becomes a pointing mechanism.

(2) If one of the four freedoms is restricted to a small range, or totally suppressed, the remaining workspace—the range of motion free of interferences and inside which the mechanical advantage of the actuators is kept approximately constant—becomes large, a property which is extremely unusual in parallel mechanisms. This is particularly remarkable if additional motion is suppressed. A constructed mechanical model has shown that a workspace in excess of 180 degrees of roll motion combined with 90 degrees of pitch and yaw motion can be achieved.

(3) In the case where the needed range of motion is small, the mechanical advantage of the actuators with respect to the output link can be selected over a wide range of values for each principal direction of motion.

(4) Again in the case of small motions, control is facilitated by the fact that each direction of motion corresponds exactly to the sums and differences of actuator motions, taken two by two.

(5) In cases where a large range of motion in the angular workspace is needed, the mechanical advantage of the actuators taken as a group can be made approximately constant and equal for each direction of motion, possibly approaching or even reaching a condition known as isotropy.

(6) The special organization of the arrangement makes it particularly easy ,to achieve high structural stiffness and accuracy in many designs as the majority of structural members are in a position to undergo well defined stresses: either compression-tension, or bending in a single plane.

(7) Parallel mechanisms with more than one or two degrees of freedom are often plagued by the necessity of numerous passive joints. This increases the cost of fabrication and if exacting specifications are not respected, this can defeat the claimed advantages of parallel mechanisms. The present invention achieves a significant reduction of the number of passive joints while retaining the required mobility.

(8) In the case where the mechanism is restricted to three degrees of freedom, to become spherical for example, it can be made to create bias forces within its structure to eliminate backlash in the joints even in the presence of wear or fabrication imprecision.

(9) Certain versions of the mechanism can be made to exhibit advantageous dynamic properties, minimizing the reaction forces at the ground link in conditions of high accelerations.

(10) The mechanism can be easily instrumented and the sensors can be placed to provide accurate measurements of the position of the output link. In fact if more sensors than strictly needed are used, the redundant information can be used to increase accuracy or perform such functions as self-calibration or self-testing.

(11) The mechanism is power efficient as compared is to many conventional mechanisms, in particular as compared to its serial counter-parts.

(12) The mechanism is advantageous from a fabrication viewpoint as it introduces simplifications which make it simpler to achieve mobility and rigidity with a reduced number of parts, some of them being replicated four times.

(13) The mechanism is particularly suited to tendon control arrangements as wire routing need not be made to run throughout the entire structure.

(14) Fabrication is made easy because of the simple type of stress supported by each joint. In addition, contrary to serial mechanisms, all joints are involved in any stress thus sharing the load.

The foregoing description has been made in respect of a primarily orienting assembly. This orienting assembly can be rendered more useful by combining it with a further positioning mechanism. The positioning mechanism hereinafter disclosed is believed to be itself novel and constitutes a separate invention as well as comprising part of the present invention.

"Positioning Mechanism"

In one of its broad aspects, the positioning mechanism of the invention may be used for effecting displacement of an end member to be positioned. It broadly comprises a linkage having four joints and four main positional links wherein:

(a) three of the four links comprise:
  (i) one base link having two ends with first and second joints mounted on such ends respectively; and
  (ii) first and second oriented links each having base and elevated ends and being coupled at their base ends to the respective ends of the base link through the first and second joints respectively;
(b) the first joint permitting orientation of the first oriented link about a center of rotation;
(c) third and fourth joints are located at the elevated end of the first and second oriented links respectively;
(d) the second and third joints being revolute, each permitting rotation about one axis with respective axes which are non-orthogonal to each other;
(e) the fourth link comprises an elevated link supported at its two ends respectively through said third and fourth joints by the two oriented links whereby the end of the elevated link at the third joint is constrained to move in a path which lies on a sphere centered at the first joint, and the end of the elevated link at the fourth joint is constrained to move in a path which is circular about the second joint.

In one variant, the first and fourth joints may be spherical. In another variant the second and fourth joints provide two degrees of rotational freedom. In yet another variant, all four joints may provide two degrees of freedom.

The positional mechanism of the invention also comprises first, second and third actuators for orienting the first and second oriented links and the elevated link:

(a) the first actuator being coupled on one side thereof to the base link, and coupled on its other side to the first oriented link in order to effect orientation of the first link about an axis which is non-orthogonal to the axis of rotation of the second joint;
(b) the second actuator being coupled on one side thereof to the base link and coupled on its other side to the second oriented link to effect orientation of such second link;
(c) the third actuator being connected between the second and elevated links to orient the elevated link with respect to the second link about an axis that is non-orthogonal to the axis of rotation of the third joint;

whereby the actuators may collectively position and orient the elevated member within a work space in which the elevated member may serve as the end member. This elevated member may also carry the orienting mechanism described above, thus combining the work-spaces of the two individual mechanisms in a combined mechanism.

By a further feature of this positional mechanism an extension member may be coupled at one of its ends to the elevated link, providing at its other end a free end whereby such free end may be positioned within a work space in response to said actuators.

Preferably, the axis of the second joint is aligned to intersect the center of rotational of the first joint and the axis of the 3rd joint may intersect the center of rotation of the 4th joint.

In a preferred configuration, the distance from the center of rotation of the first joint to the axis of the third joint is substantially equal to the distance from the center of rotation of the fourth joint to the axis of rotation of the second joint, rendering the mechanism capable of assuming a rectangular form.

A positional mechanism in accordance with the invention can provide three degrees of freedom which permit the elevated member to serve as an end member that can be positioned anywhere within its workspace. A restricted variant can provide two degrees of freedom to serve as a pointing mechanism.

Because two actuators are grounded, the supported mass of the system is minimized, reducing its inertia and improving its dynamic response characteristics. Similarly, as the first and second oriented links are supported at grounded links, they may be shaped to minimize their inertia while achieving a desired level of structural supporting capacity.

An efficient characteristic of the mechanism of the invention is that two of the three positional motions can be achieved through differential motion of the two grounded actuators. By providing a locking characteristic to the third, elevated actuator, force-demanding activities, such as lifting heaving loads, can be achieved through activation of the grounded actuators only. By selecting various lengths for the links, a range of mechanical gains can be achieved.

One particularly attractive mode of operation of the positional mechanism of the invention is to activate the joints through use of cables or tendons. Because the oriented links are grounded at one end and can be placed generally upright in their position, they are favourably positioned to support the stresses generated by tensioning control cables. Loads can be supported and cables rigged so that each joint is exposed only to simple stresses.

The operation of the positional mechanism of the invention in accordance with these variants requires co-ordination of the actions of the three actuators. This is readily effected through modern micro-electronic circuitry, an option not available in the past at the cost and performance levels available.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

"Operation of Orienting Mechanism with Rotary Actuators"

Figure 1:
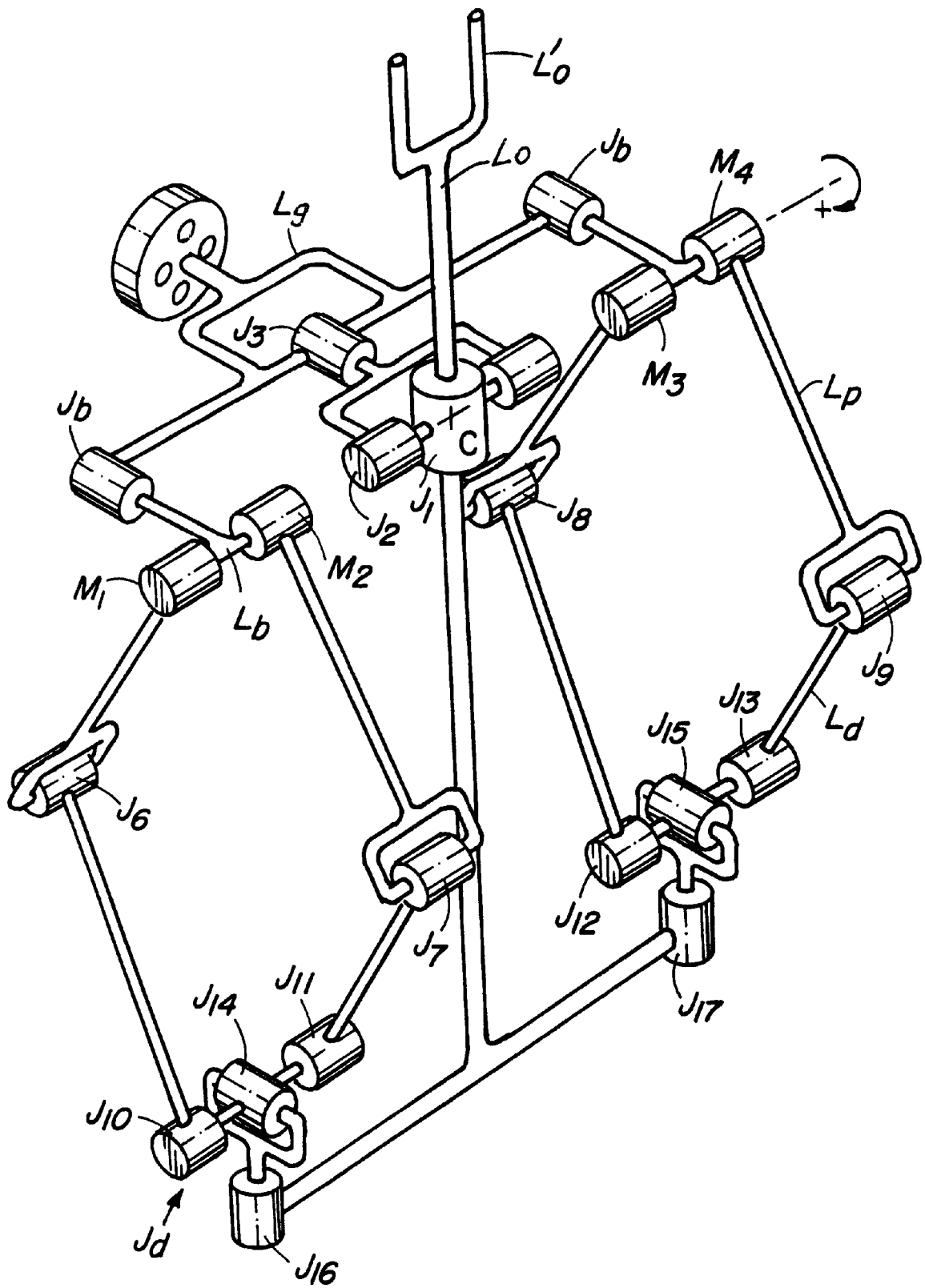
FIG. 1 is a symbolic depiction of the rotary actuated form of orienting mechanism, identifying the links and joints therein.
Figure 2:
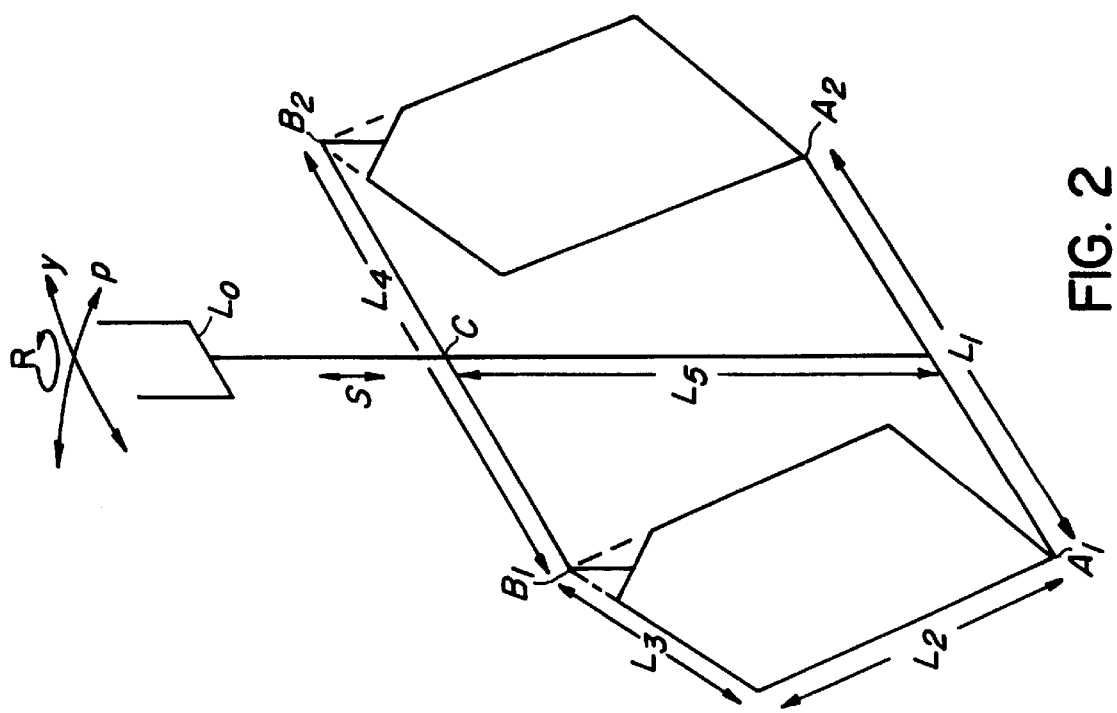
FIG. 2 is a schematic of the links of the orienting mechanism when rotary actuators are employed labelled to show important dimensions.

The main links which play a structural role are labelled in FIGS. 1 and 2 as follows: Lo (output link) which, together with its forked end $L_b$, functions as an end member, Lg (ground link), Lb (base link), Lp (proximal link), Ld (distal link). Five link lengths L1, L2, L3, L4 and L5 shown in FIG. 2 describe the basic geometry, they are basic kinematic design parameters. In FIG. 2 the principal directions of motion for the output link Lo are labelled R (roll), P (pitch), Y (yaw) and S (slide). Joints labelled M1, M2, M3, M4 in FIG. 1 are rotary joints actuated by motors. By convention a positive direction of motion is indicated. Joints labelled J1, J2, J3, form a passive spherical joint (or gimbal). J1 is optionally a cylindrical joint allowing the output link Lo to slide in and out, as indicated by S in FIG. 2.

Joints J10, J11, J12, J13, J14, J15, J16 and J17 form the driven, twinned spherical joints (as explained further below). The common axes of joints Ml, M2, and M3, M4 (resp. J10, J11, J12, J13) do not need to be coincidental. They are represented or constructed this way for simplicity of depiction. Jb is the base joint supporting each 5-bar linkage.

Joints labelled J6, J7, J8, J9 within the dual 5-bar linkages, joining the proximal and distal links Lp, Ld are revolute. There are several ways to implement the four-joint substructures J10, J11, J14, J16 and J12, J13, J15, J17 in a manner which is similar to ordinary universal joints for example, using forks.

In the above Figures, several features are optional. F or example, the center of rotation of the support joint constituted by joints J1, J2, J3 need not be coincident with the axes of the joints Ml, M2, M3, M4. symmetries have been introduced to simplify analysis and fabrication.

Referring to FIGS. 1 and 2, the principles of operation of this rotary-activated embodiment may be summarized as follows:

Let joints M1, M2, M3, M4, rotate in the positive direction: the output link undergoes a pitch motion.

Let joints M1, M2, rotate in the positive direction and joints M3, M4, in the negative one: the output link undergoes a roll motion.

Let joints M1, M4 rotate in the positive direction and joints M2, M3 in the negative one: the output link undergoes a yaw motion.

Let joints M1, M3 rotate in the positive direction and joints M2, M4 in the negative one: the output link undergoes a sliding motion.

"Summary of Features–Rotary Actuators"

Figure 4:
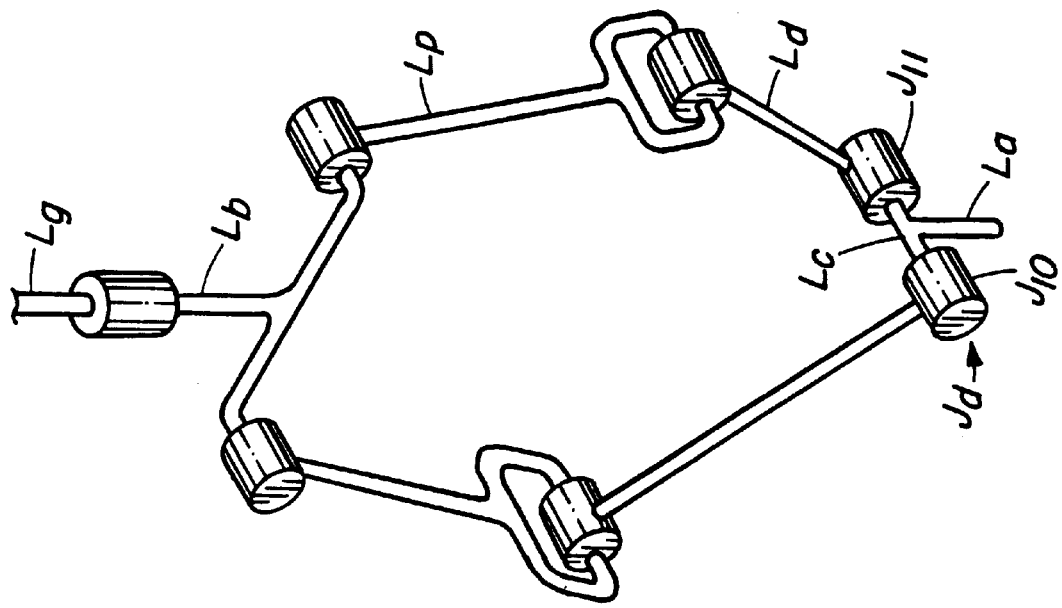
FIG. 4 is a schematic of a constrained six-bar linkage that functions as a five-bar linkage and is considered to be as such for the purposes of this Specification.
Figure 3:
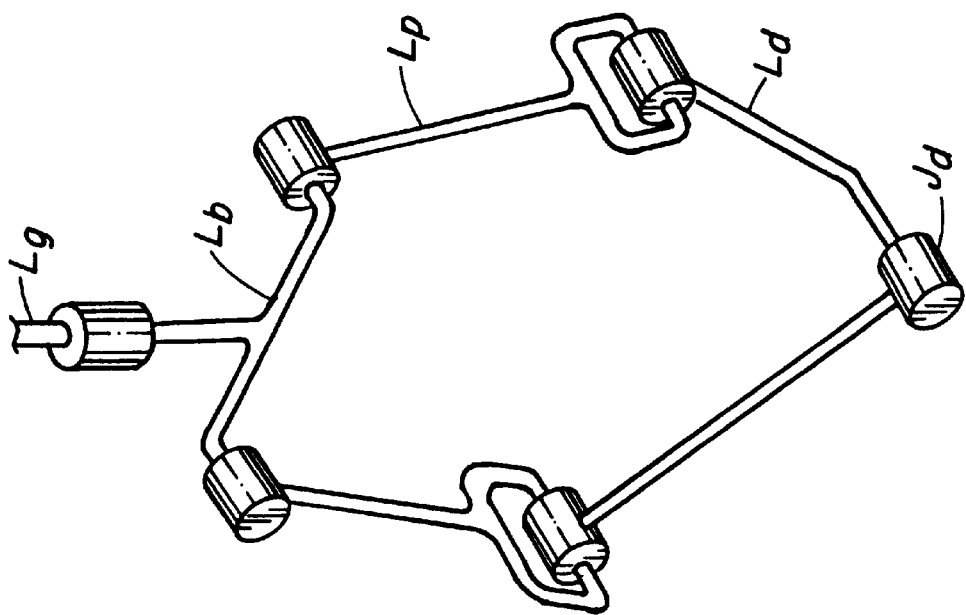
FIG. 3 is a schematic of a five-bar linkage.

1. Feature 1: It must be noticed that the two actuated 5-bar structures appear as six joint/six link assemblies. The six joints and six links arise from the fact that the basic 5-bar linkage—FIGS. 1–4 includes a driven joint Jd which is twinned (being either spherical or universal) as shown in FIG. 4 by joints J10 and J11 (resp. J12, J13) and is connected to the end member through an additional link, La. This sixth link La is, however, outside the 5-bar loop (FIG. 4) and the two revolute joints J10, J11 (resp. J12, J13) share a common axle Lc connected to the additional link La. It is therefore characterized as a 5-bar linkage for the purposes of this Specification.

As a six joint/six link assembly, this structure appears to be an over-constrained chain, thereby potentially losing mobility. However, this type of structure is commonly made to function properly by keeping all axes parallel, which is a simple machining operation. In cases of exacting specifications, the problem can be dealt with by introducing suitable elasticity in the links.

2. Feature 2: Singularities occur either:

(1) when the output can undergo finite displacements while one of the actuator's velocity vanishes: or, (2) when the converse condition occurs.

Condition (1) occurs for example when the mechanism is in a position such that points C, B1, A1 or C, B2, A2 align, as shown in FIG. 2. By design such conditions can be avoided for large excursions. In addition, even in such positions where actuators M1 and M2 lose their influence on the yaw motion of the output link, M3 and M4 would be capable of controlling this motion.

Condition (1) also occurs when points A1 and A2 both undergo a motion in a direction exactly orthogonal to the principal direction of a distal link. Proper functioning has, however, been verified by constructing mechanical models and it was impossible to find such conditions within any workspace free of interferences.

Condition (2) occurs when one 5-bar linkage stretches completely. This may put a definite bound on the workspace as a degree of freedom is lost. Construction of mechanical models has shown that such conditions can be avoided with a proper choice of design parameters.

3. Feature 3: A wide range of mechanical amplification gains or attenuations is achievable by selecting the distance L5 between the central support joint for the output link Lo and the line joining the driven joints A1, A2 (as shown in FIG. 2) and the link-length parameters L2, L3, L4, being the proximal and distal link lengths and the distance of separation between the actuated joints. These lengths may be chosen to vary the angle of incidence of each connecting link in order to create various lever-arm actions around the pitch and the yaw directions.

4. Feature 4: The mechanism has the ability to operate with each effected motion based on the sum and differences of actuator motion for wide ranges of designs and in the neighbourhood of any operating point. This property can be exploited by making use of analog electronics to control the device, despite its complex kinematic structure, and thereby achieving very high control bandwidth. This is because no multiplications are needed other than by constant quantities, due to the four way differential nature of the driving actions.

5. Feature 5: The mechanical advantage changes mildly for yaw motions as one structure extends while the other contracts. It changes moderately for sliding motions.

It remains almost constant for pitch motions. The worse case occurs for retractions combined with a roll. Depending on the intended application, many designs are possible. For a general purpose device, one should seek angular isotropy. For example, it is easy to see that if the point C, the center of rotation for the output link, falls on the line joining the points B1, B2 in FIG. 2, then the mechanical gain in pitch motions is exactly 1 for each actuator. The other design parameters can be searched for similar conditions for the other motions. To date, a good general design has been found for the following length parameters: L1=4, L2=3, L3=4, L4=4, L5=4 (spherical case).

6. Feature 6: If we replace cylindrical joint J1 in FIG. 1 by a revolute joint, eliminating the sliding motion, the angular workspace can then be made to reach its maximum. In this case, we are in the presence of a redundantly actuated mechanism. For a given output torque, an infinite set of actuator torques can be chosen by control. This effect can be applied to fulfil a number of functions. For example, the set of torques can be selected to create minimum stress in the structure. Another example is to select those torques required to minimize the maximum torque in the actuators for a given output, thereby maximizing efficiency. Yet another example is to create given bias forces in the joints, thereby cancelling backlash if any.

This particular effect can be appreciated by inspection of FIG. 1. If a positive torque is created in actuators M1, M3 while a negative one is created in M2, M4 (corresponding to the eliminated sliding motion), the resulting forces cancel out and all the passive joints are bias-loaded in one well defined direction. Thus, accuracy can be upheld even in the presence of wear.

7. Feature 7: Consider a fixed inertial load acting vertically on the output link Lo. If its center of mass lies on the axis of joint J1, then sliding motions will not create reaction forces and torques other than those that are exactly in the direction of motion. If the combined contribution of the load and links to the inertial tensor of the total mechanism causes the axes of the corresponding ellipsoid of inertia to coincide with the principal directions of motion, and this ellipsoid is centered at the center of rotation, then angular accelerations will create zero reaction forces at the ground link, and only reaction torques. This is even more desirable if all the axes of this ellipsoid are equal, in which case this effect is obtained for any direction of rotational acceleration. This feature is particularly useful for high acceleration, high bandwidth applications.

8. Feature 8: The most obvious place for sensors to be located is on the same shaft as the actuators. However, the joints J6, J7, J8, J9 are also excellent candidates for instrumentation, as well as joints J1, J2, J3. Redundant sensing offers a range of possibilities including augmentation of accuracy and usage of self-calibration techniques. The spherical case with co-located actuators and sensors is sensor-redundant too.

This invention does not suffer from accumulation of errors as a serial mechanism does. In fact exactly the opposite occurs, error reduction is obtained as all sensors are made to measure any motion or position. In an analogous way all actuators are made to cause any motion. In the serial case, each sensor and actuator is dedicated to each principal direction of motion, and therefore errors accumulate.

9. Feature 9: Consider a sliding motion for example. In the serial case only joint J1 contributes power to this motion. The design of the invention will require the contribution of all four actuators to cause the same motion. The same argument can be repeated for all four principal directions of motion, it thus follows that this design can achieve a factor four in power efficiency improvement.

"Operation of Orienting Mechanism with Linear Actuators"

Figure 5:
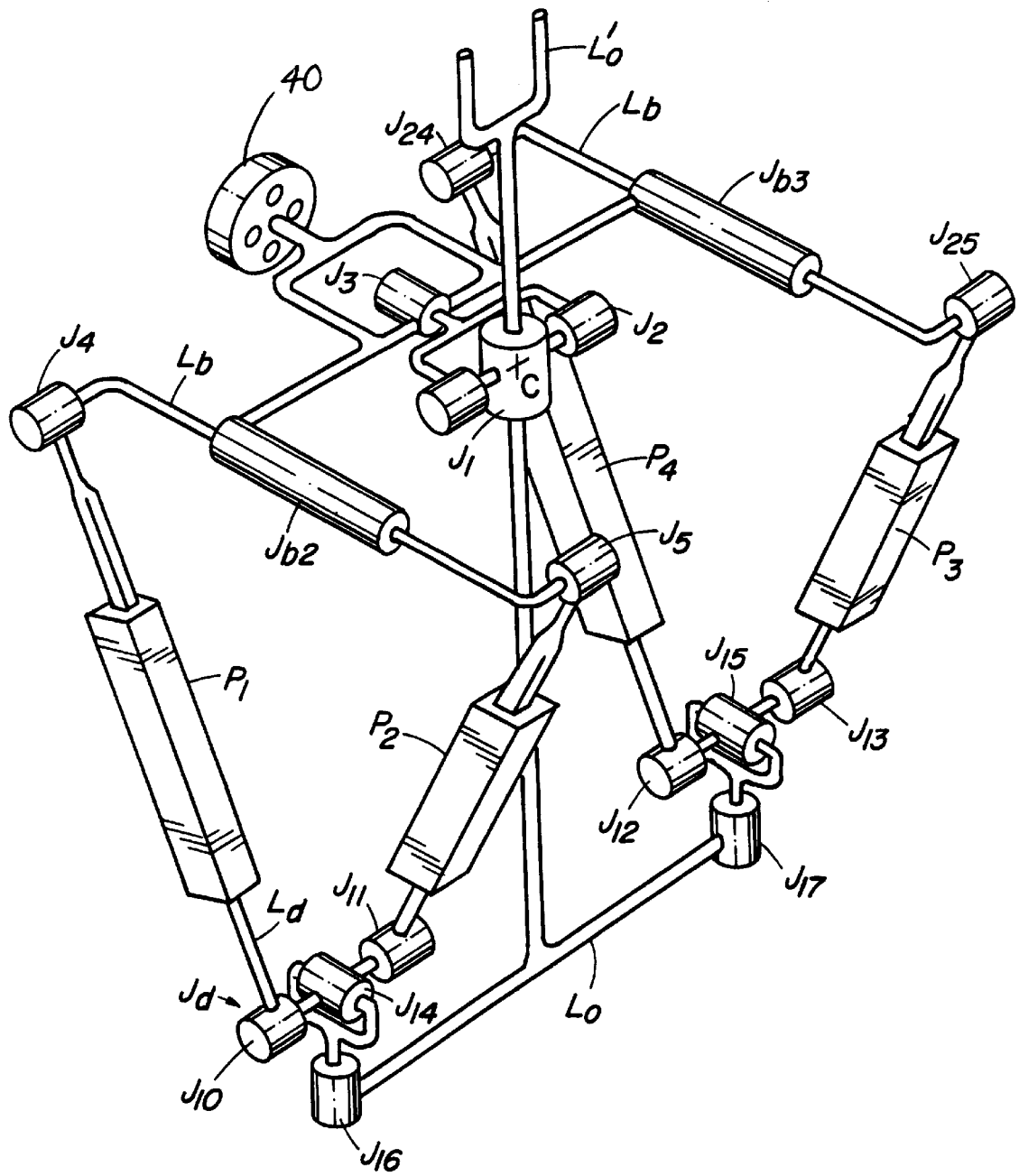
FIG. 5 is a pictorial depiction of the linear-actuated form of the orienting mechanism, identifying the links, joints and actuators (in the form of prismatic cylinders).

Joints labelled P1, P2, P3, P4 in FIG. 5 are actuated prismatic joints. By convention the positive direction is taken in the sense of actuator shortening. As in the prior case, joints labelled J1, J2, J3 form a passive gimbal, with J1 optionally being a cylindrical joint, allowing the output link Lo to slide in and out.

The axes of joints J10, J11, (resp. J12, J13) whereby the distal links Ld join at the driven joint Jd do not need to be coincidental. They are represented or constructed this way for simplicity.

Figure 6:
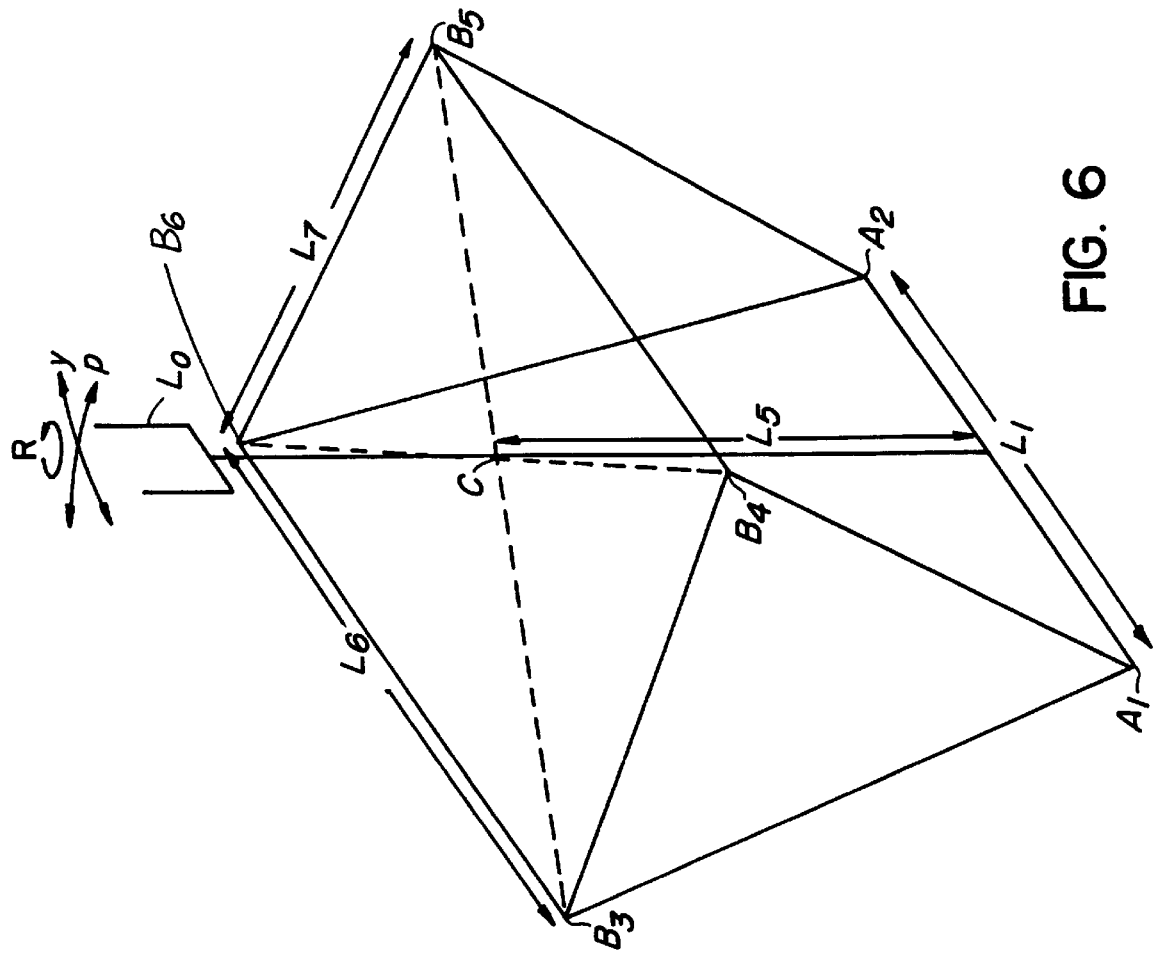
FIG. 6 is a schematic of the links of the orienting mechanism when linear actuators are employed showing important dimensions.

Again, in FIG. 5 as in FIG. 1, symmetries have been introduced to simplify analysis and fabrication. FIG. 6 shows the important kinematic design parameters of this linear-actuator version of the invention wherein B3, B4, B5 and B6 are respectively the points at the intersection of the axes of the joints J4 and base joint $J_{b2}$, $J_5$ and base joint $J_{b2}$, $J_{24}$ base joint and $J_{b3}$, $J_{25}$ base joint and $J_{b3}$ and base joint $J_{b3}$. L6 is the distance between the points B3, B6 (resp. B4, B5); and L7 is the distance between the points B3, B4 (resp. B5, B6).

Referring to the FIGS. 5 and 6, the principles of operation of this linear-activated, orienting embodiment are as follows:

Let joints P1, P2, P3, P4 translate in the positive direction: the output link Lo undergoes a sliding motion.

Let joints P1, P2 translate in the positive direction and joints P3, P4 in the negative one. The output link Lo undergoes a yaw motion.

Let joints P1, P4 translate in the positive direction and joints P2, P3 in the negative one. The output link Lo undergoes a pitch motion.

Let joints P1, P3 translate in the positive direction and joints P2, P4 in the negative one. The output link Lo undergoes a roll motion. "Summary of Features—Linear Actuators":

1. Feature 1 is to analogous Feature 1 as referenced above for Rotary Actuators.
2. Feature 2 is also analogous to Feature 2 for Rotary Actuators, above, except that the algebraic determination of locus of singularities has been performed in the spherical case and for when the distance L5, which separates the line joining points A1, and A2 from the center of rotation C is not of zero length. It was found that loss of control condition occurs only in the case where points A1, A2 as depicted in FIG. 6 falls in the plane B3, B4, B5, B6 which corresponds to a 90 degrees pitch motion. Condition (2) of previous case never occurs.

3. Feature 3 is exactly analogous to the previous case of Feature 3 for Rotary Actuators, above.
4. Feature 4 is exactly analogous to the previous case of Feature 4 for Rotary Actuators, above. In fact, the determination of the various mechanical gains is simpler.
5. Feature 5 is analogous to the previous case of Feature 5 for Rotary Actuators, above. With the length L5 chosen arbitrarily as being 10 units a good design has been found for the following parameters L1=8, L6=8, L7=12 where L6 and L7 are respectively the distance between the joints J4, J5 and the distance between the joints J6, J7 (or J8, J9). One disadvantage of the linear actuator design is the requirement to provide room for the actuators to move free of interference—as their length is by necessity larger than twice their stroke on the extended position while their retracted length must be larger than their stroke. However a practical design with piston actuators has been physically realized.
6. Feature 6: By analogy with the previous case of Feature 6 for Rotary Actuators, above, cylindrical joint J1 can be replaced by a revolute and the mechanism becomes spherical with three degrees of angular freedom.
7. Feature 7: This is exactly analogous to the previous case of Feature 7 for Rotary Actuators, above.
8. Feature 8: Even if the actuators are piston type, thus typically being cylindrical pairs, they are constrained to undergo strictly translational motions with no twist. Therefore, position sensors can safely be strapped on their sides without need for torsion decoupling joints, simplifying design and construction. In fact the linear actuator design is even more advantageous for achieving high rigidity.
9. Feature 9: The mechanical advantage varies most significantly for roll motions, as both regional 5-bar actuator structures extend simultaneously, thus losing their advantage together. It must be remembered that the effective range of motion around this direction is in excess of 180 degrees irrespective of other motions.

"Applications for the Orienting Mechanism High—Performance Shoulder Mechanism"

Figure 7:
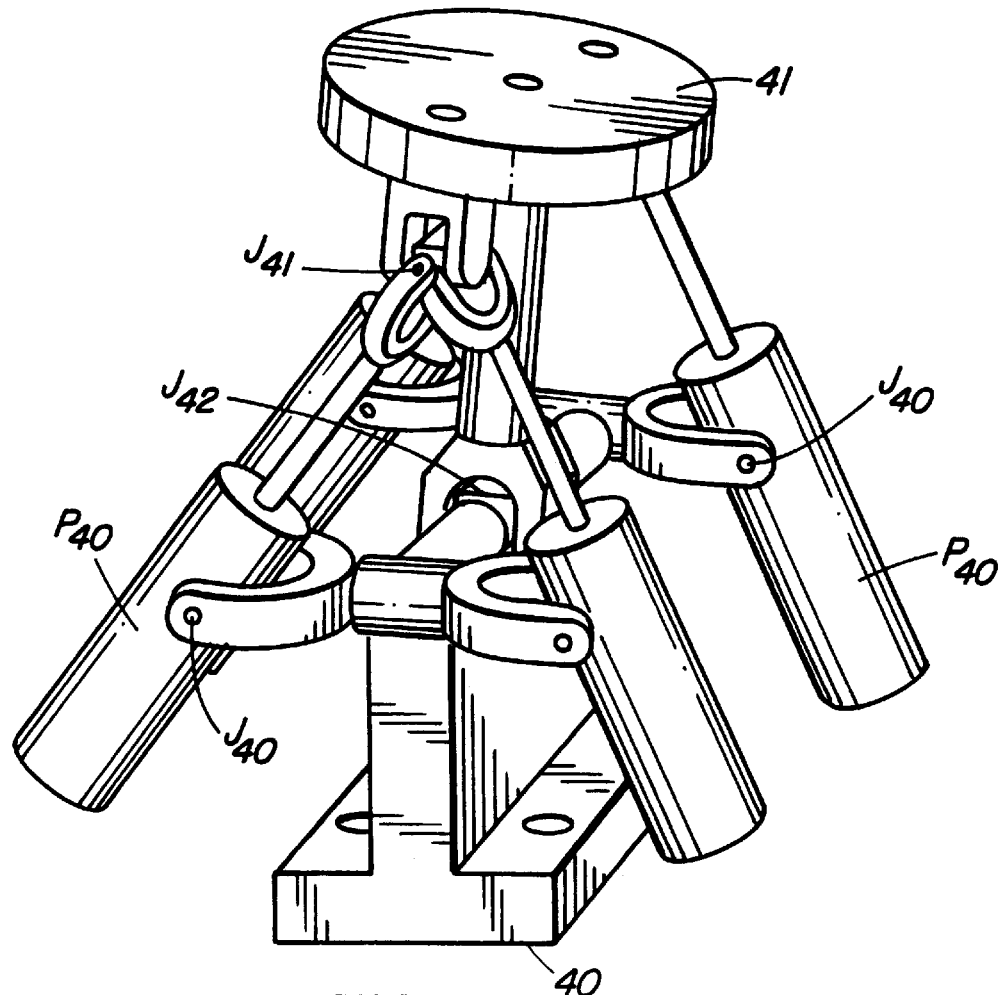
FIG. 7 is a depiction of a robot manipulator shoulder mechanism equipped with linear actuators.

The robot manipulator joint of FIG. 7 has four linear actuators P40 supported off a base 40 by four revolute joints J40. In pairs the pistons of the actuators P40 meet at two twinned spherical joints J41 that support a platform 41 which serves as an end member. A spherical joint J42 constrains the platform 41 to spherical motions about its center. This shoulder mechanism is designed to support large loads (up to 150 Nm around any axis at 350 N/cm$^2$ pressure supply and with 22.2 mm bore diameter cylinders), while featuring a large workspace (90 degrees, 90 degrees, 180 degrees) and low weight. Because of the various properties claimed earlier, a very simple fabrication process achieves superior performance and the reduction of parts count. In our laboratory version, each actuator has been instrumented with position and force transducers.

"Applications—Mining & Civil Engineering Applications"

Figure 8:
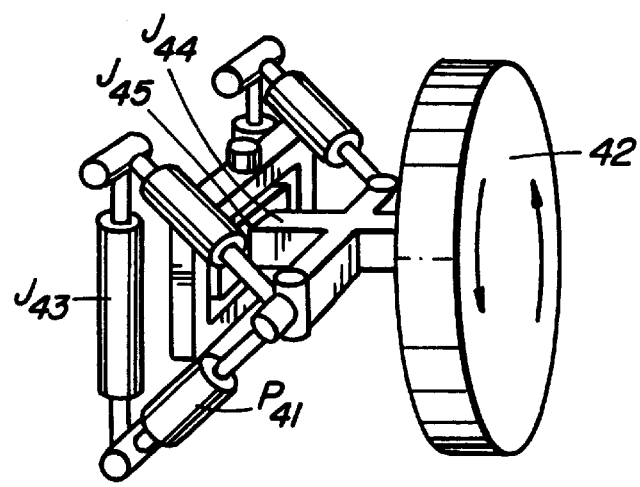
FIG. 8 is a depiction of a rotary cutting head mounted on a structure according to the orienting mechanism of the invention and suited for boring operations.

In mining applications, machines with high structural stiffness and high strength are required. For example, in a boring machine a simplified version of the invention as shown in FIG. 8 can be applied to produce three degrees of freedom, all controllable with high power. A high load-bearing capacity is available for the cutting head 42, serving as the end member since all four hydraulic actuators P41 (seated through revolute joints J43 that are carried by a vehicle—not shown), can be applied to contribute to the forward thrust, as well as generating lateral and vertical orientations.

The general roll motion of the cutter head 42 support is suppressed by means of a prismatic joint J44 replacing the original cylindrical joint that connects to the supporting universal joint J45. The continuous rotary motion required by the cutting head 42 can be produced by a dedicated independent motor (not shown) that can be placed behind the mechanism. A simplified kinematic structure results from the reduction of controlled degrees of freedom but the overall principle remains identical.

Because of the differential nature of the principle of operation, suitable control can be achieved with simplicity through the use of four-way hydraulic valves and hydraulic circuitry.

"Applications—Optical And Micro Precision Applications"

Figure 9:
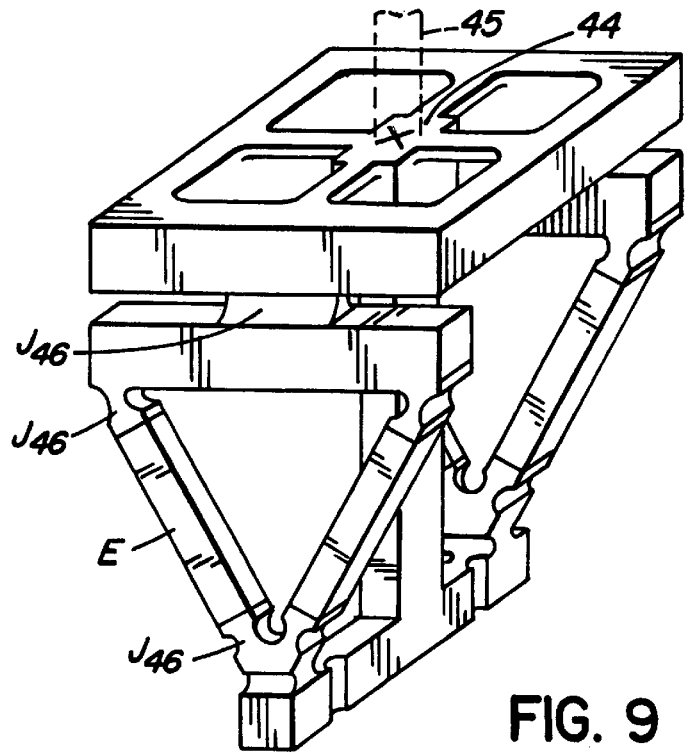
FIG. 9 is a depiction of a support suited for orienting optical gratings and the like utilizing the orienting mechanism of the invention.

In FIG. 9, micro-motion actuators of the piezo-electric type marked E are used to displace a central output platform 44 corresponding to the base 40 in FIG. 5 with micro precision in all four degrees of freedom. In an optical instrument for example, a grating can be micro-rotated around the three principal directions of motion and translated, all in one single mechanism.

All joints J46 may be realized by means of thin sections and thin rods for elimination of backlash and high rigidity. In this example, the entire body of the mechanism can be machined out of one single block of material, forming the thin sections first, then the structure, then the four legs with the actuators E bonded in place last. Using various geometries, wide ranges of mechanical gain can be selected for each direction of motion.

In a micro-surgery application, the platform 44 which serves as the output link may be extended in one or the other directions by a cantilevered arm 45, shown in ghost outline. If this cantilevered arm 45 is long with respect to the other dimensions, the tip will approximate closely a manipulator with three degrees of freedom of translation and one of rotation around its principal axis.

"Applications—Joystick With Motorization"

In aircraft control, robotics, forestry, excavation, and more generally in the operator/computer-assisted control of machines, joysticks with multi-degree of freedom are needed. In advanced applications joysticks are designed to impart forces in the operator's hand.

Figure 10:
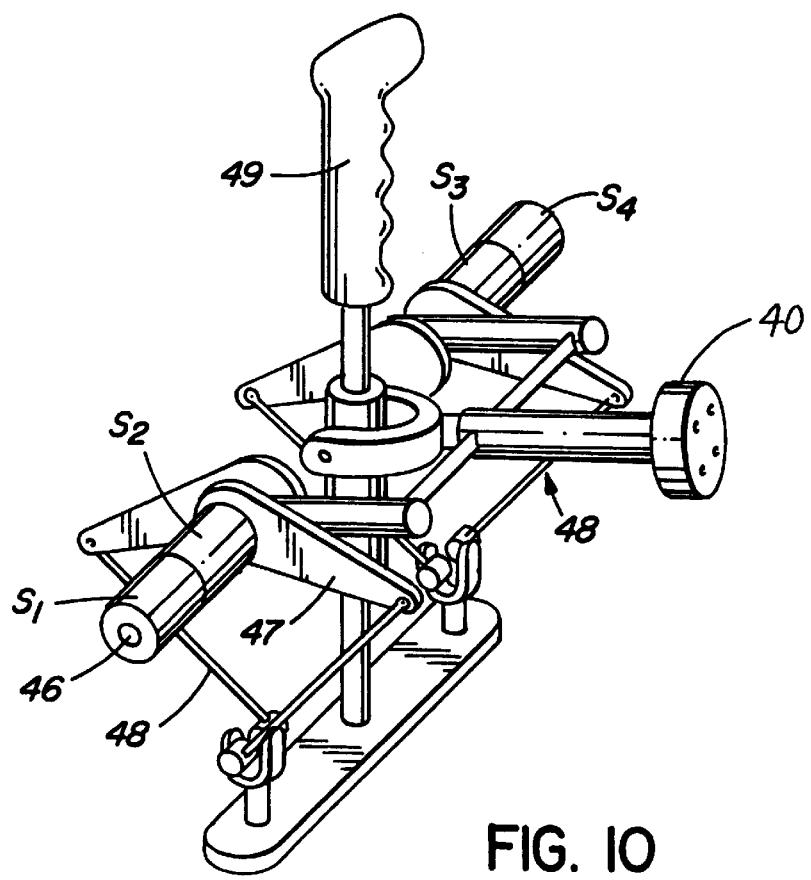
FIG. 10 is a depiction of an orienting mechanism based on the invention for supporting a joy stick.

The embodiment of the invention of FIG. 10 offers an opportunity to design such joysticks with a high degree of simplicity. In these applications electric actuators and sensors are often a prerequisite. Here four rotary actuator/sensors S1, S2, S3, S4 are employed mounted two-by-two on coaxial shafts 46 that respectively connect to the proximal links 47 in each 5-bar linkage 48 mounted on base 40. Movement of the joystick 49, otherwise kinetically the "end member" will activate the sensors S1–S4 through the motions as described above, providing a precise output corresponding to such movements. Note that other opportunities exist to place displacement sensors (not shown) in other favorable joints and introduce numerous improvements to this basic design.

"Applications—Excavation, Forestry Applications"

Conventional excavators and forestry machines typically use a turret swivelling around a vertical axis fixed with respect to the chassis of the vehicle, the seat of the operator swivelling with the rest of the machine to provide for visual control. When such machines are used on uneven terrain, the swivelling axis will not be vertical. It follows that the operator has to compensate with bending of his/her back which results in injuries. The machine itself must be designed to accommodate similar stresses.

Figure 11:
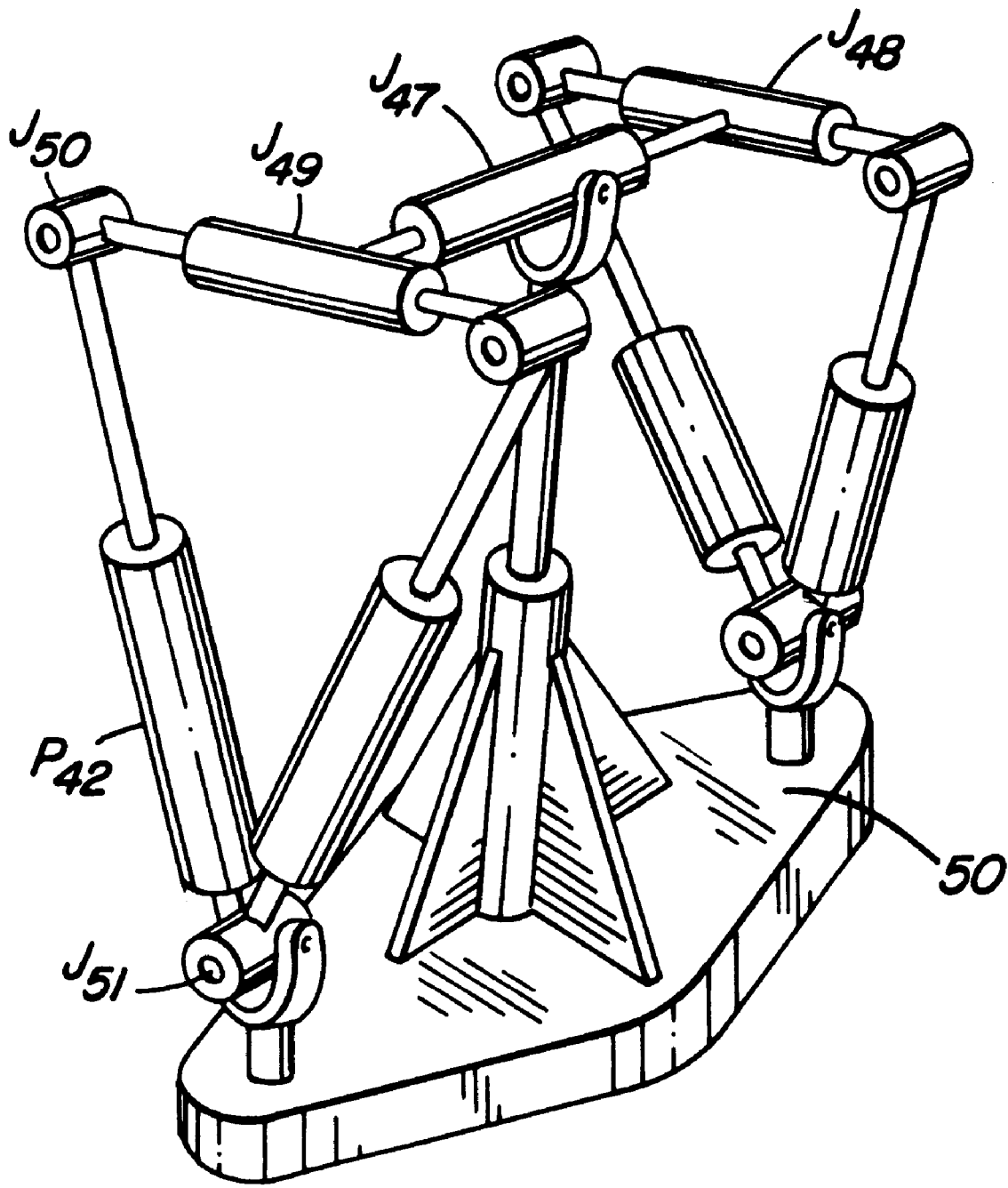
FIG. 11 is a depiction of an inverted configuration (to the orientation of FIG. 7) of the orienting mechanism to provide a levelling platform for a turret.

In the FIG. 11 application we employ the spherical version of the invention to keep a turret horizontal during swivelling, regardless of the position of the chassis.

This configuration is "inverted" in that the output link is the top platform supported (not shown) by joints J48/J49. These joints are supported through appropriate intermediate joints J50 by hydraulic piston-type cylinders P42 that seat on a cross support 50 through spherical joints J51. This cross-support 50 corresponds to the link portion Lo in FIG. 5, spanning between $J_{16}$ and $J_{17}$.

Because of the large stroke required from the pistons P42, the geometry has to be made with a long vertical dimension. In fact in this case, the roll motion is maximized, possibly in excess of 200 degrees with a corresponding decrease in the mechanical advantage around the roll motion, but it is precisely the direction which requires the least (or less) torque for this application.

"Applications—Antenna Pointing"

Figure 12:
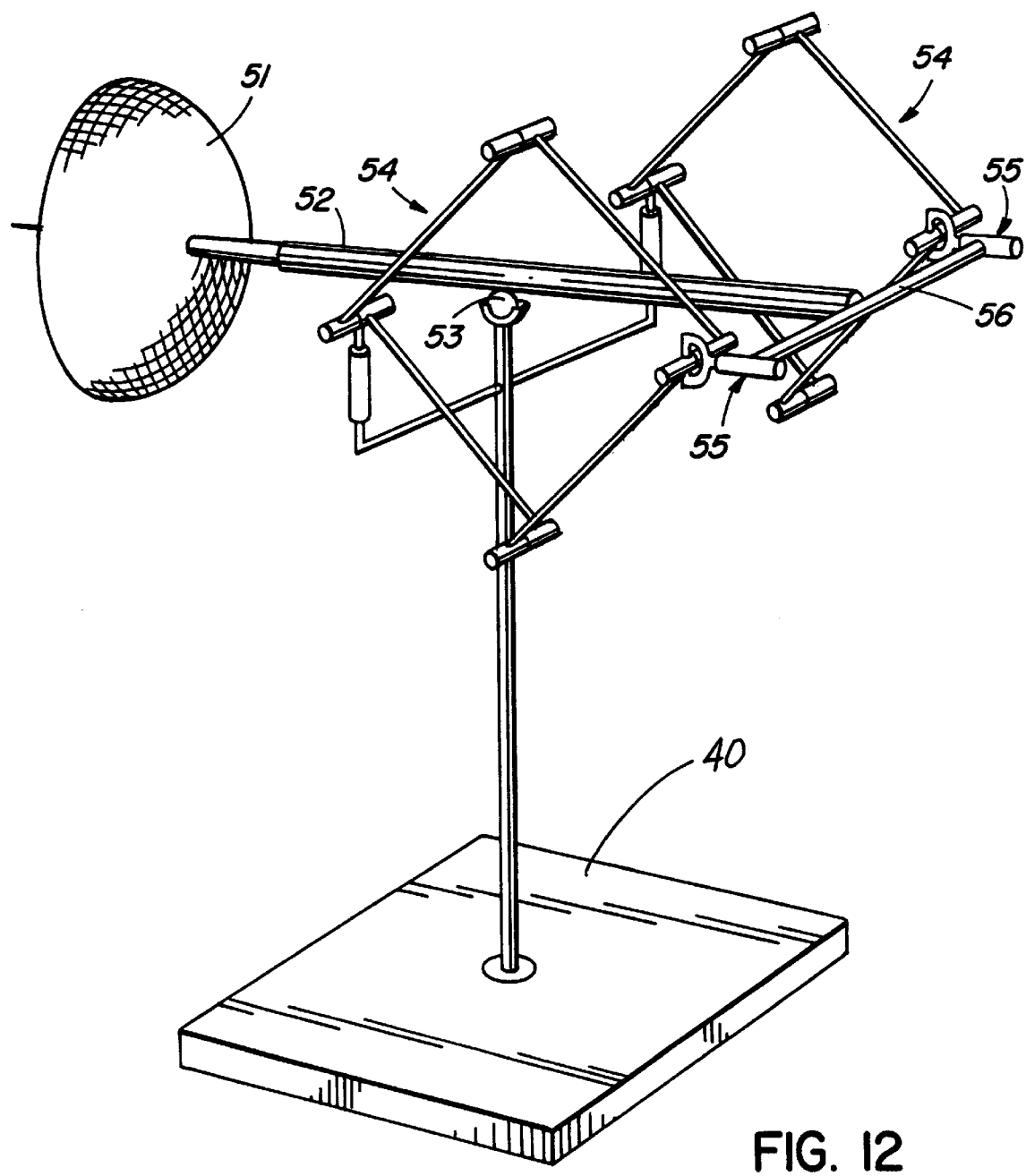
FIG. 12 is a pictorial depiction of the dual 5-bar linkages of the orienting mechanism used to support and point an antenna.

In FIG. 12 a rotary-actuated version of the mechanism suited to pointing an antenna is depicted. The antenna 51 is carried by end member 52 that is supported by the spherical support joint 53. The dual 5-bar linkages 54 are connected through the universal (or spherical) driven joints 55 to the end member 56. Spherical driven joints 55 would be suitable if the antenna 51 were to exhibit roll motion, as to allow for the receipt or transmission of polarized radio signals.

"Operation of Positional Mechanism"

Figure 13:
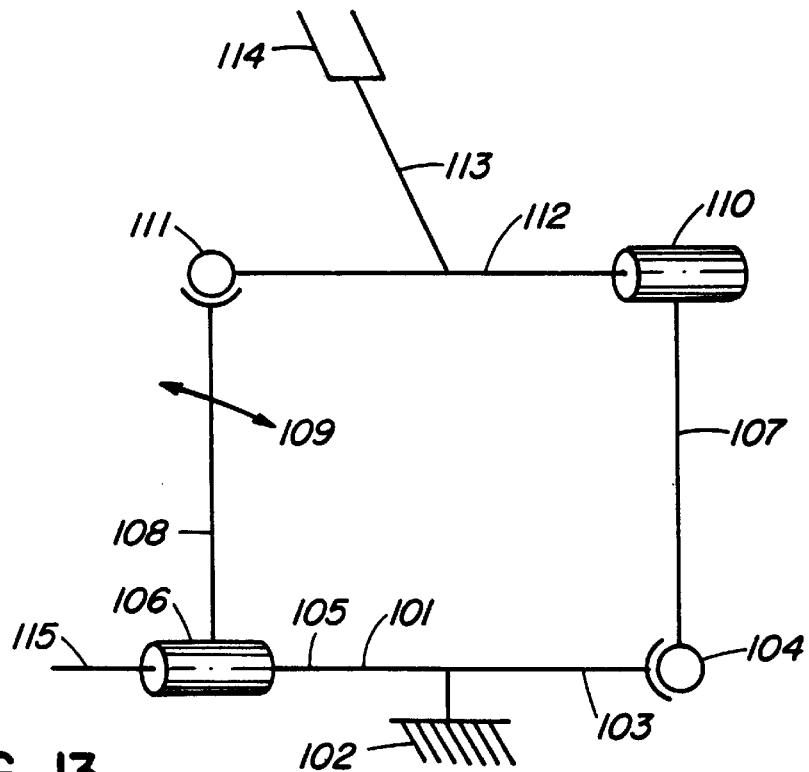
FIG. 13 is a symbolic depiction of the links and joints of the positional mechanism of the invention, wherein the elevated link supports an end effector.

In FIG. 13 a base link 101 is grounded, as by attaching it to an immoveable reference 102. At a first end 103 a first spherical joint 104 is provided. At the other, second end 105 a second, revolute joint 106 is provided. First and second oriented links 107, 108 are coupled to the spherical 104 and revolute 106 joints respectively. Revolute joint 106 has freedom of motion in the lateral direction 109 indicated by the arrow. The first oriented link 107 has a freedom of motion that is subject to the constraints of the adjacent elements.

The first and second oriented links 107, 108 terminate in a third, revolute joint 110 and a fourth, spherical 111 joint respectively. An elevated link 112 extends between and is carried by these latter joints 110, 111. An extension 113 is connected to the elevated link 112, terminating at its distal end with an end effector 114.

While the second link 108 is supported by a revolute joint 106 and is thereby limited to rotational displacement about the axis 115 of that joint, the first link 107 can only swing in a path that is subject to the constraint imposed by the presence of the elevated link 112. The first link 107 can follow the displacement of the second link 108 by rotating in a parallel plane. But if the second link 108 is fixed, the first link 107 can only swing in a path that will cause the elevated link 112 to rotate about the spherical joint 111.

The first action permits the end effector 114 to be elevated. And the second motion causes the end effector 114 to be displaced laterally, as well as effecting its elevation. By a judicious simultaneous adjustment of the second joint 106 in conjunction with the first 104 and third 110 joints, lateral displacement of the end effector 114, without a change in elevation, can be created.

Figure 14:
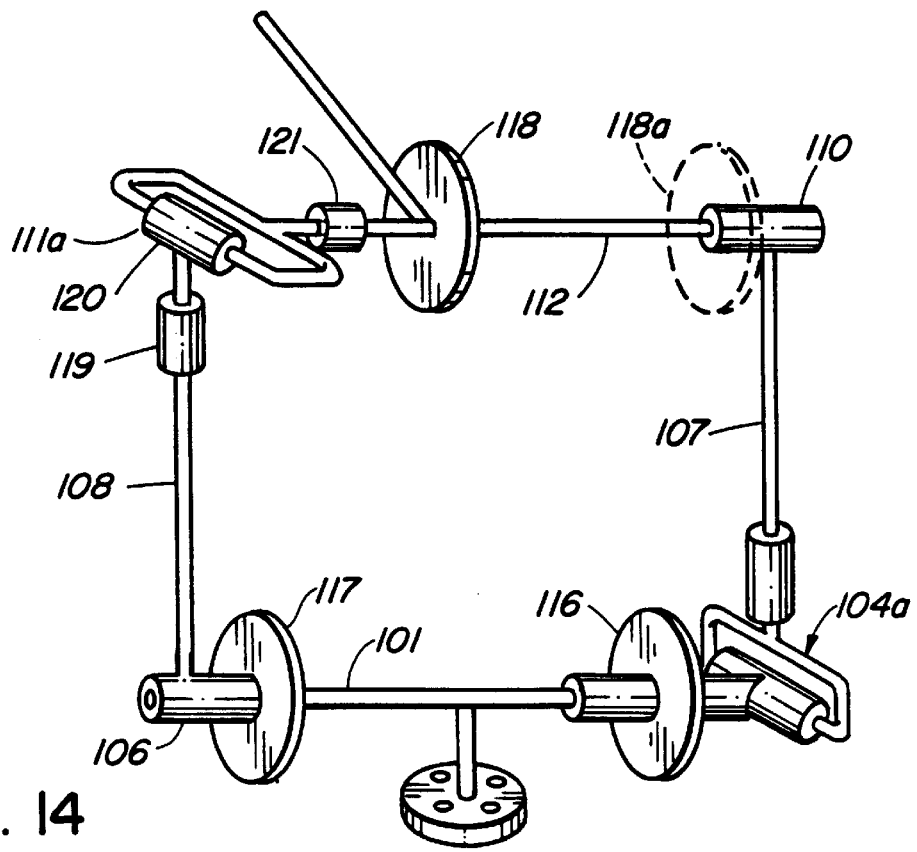
FIG. 14 is a further pictorial depiction of the positional mechanism of FIG. 13 wherein the details of optional actuator joint arrangements employing revolute couplings are depicted.

Actuators for effecting such motions are depicted in FIG. 14 in the form of pulleys 116, 117, 118, associated with the first 104a, second 106 and third 110 joints respectively.

These pulleys 116, 117, 118 can be rotated by cables or tendons (not shown in FIG. 14).

The pulley actuators 116, 117 cause rotation of the joints 104a, 106 about the grounded axis of the base link 101. The axes of joints 104a, 106 need not be necessarily aligned, or parallel. This effects the orienting of the oriented links 107, 108.

The pulley 118 associated with the elevated link 112 causes rotation of the elevated link 112 about the axis of the third cylindrical joint 110. While shown as mounted adjacent to the composite spherical fourth joint 111a, a joint of triple-revolute form composed of revolute joints 119, 120 and 121, this pulley 118 can equally be placed adjacent to the revolute joint 110, where it is shown in ghost outline as 118a. The function of this pulley 118, 118a in either case is to effect rotation of the elevated link 112 about the axis of the third, revolute joint 110.

Figure 15:
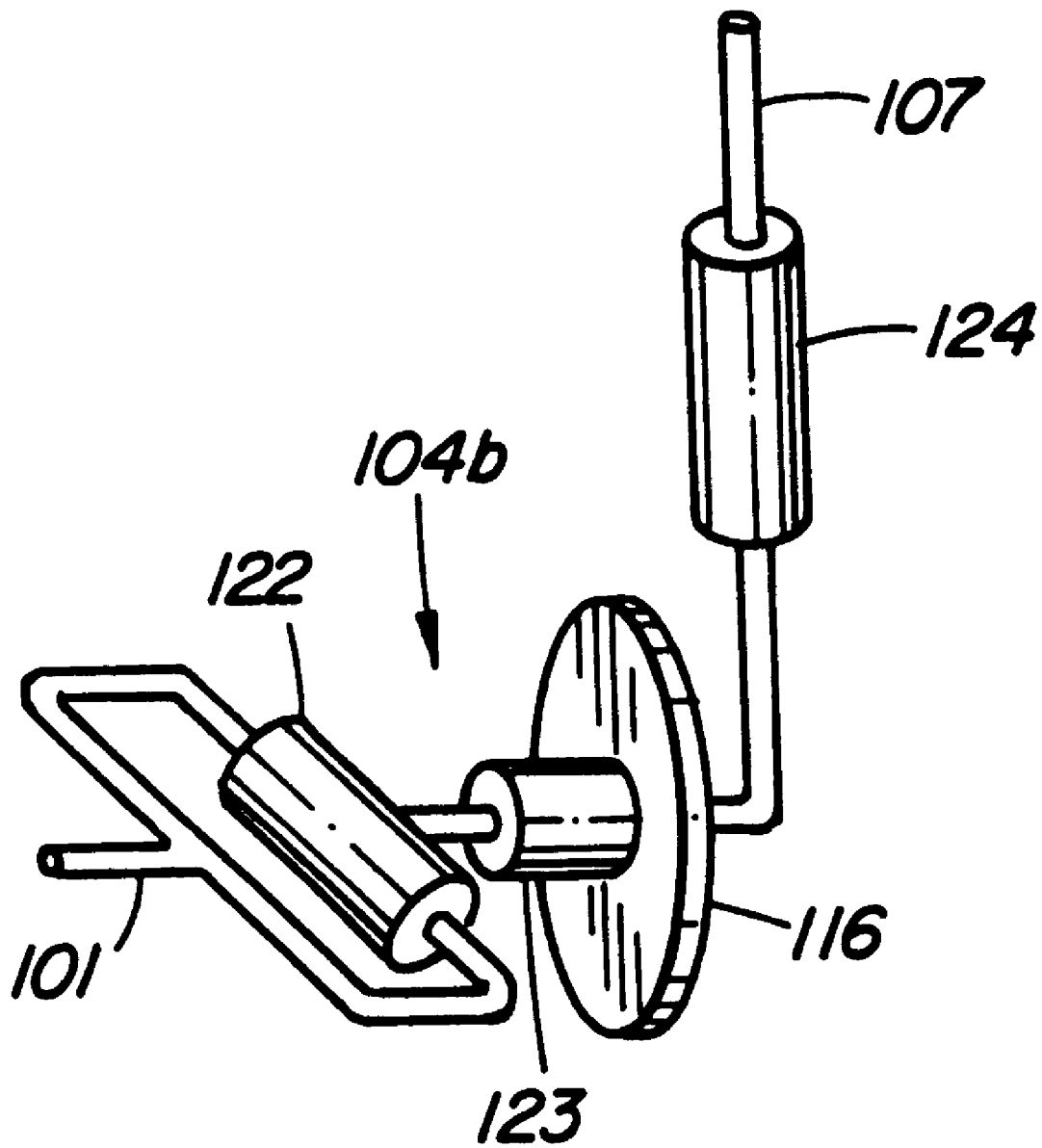
FIG. 15 is an enlarged detail of an alternate joint and actuator arrangement to that of FIG. 14.

An optional transposition is possible in the first spherical joint 104a by constructing it in the form of a composite Hook joint 104b. As shown in FIG. 15, the pulley 116 may be placed within the internal linkages joining the revolute joints 122, 123 and 124 to cause rotation of the third revolute joint 124. Again, the object is to cause the first link 107 to rotate with respect to the base link 101 (although not necessarily within a plane that is parallel to the alignment of base link 101).

Figure 16:
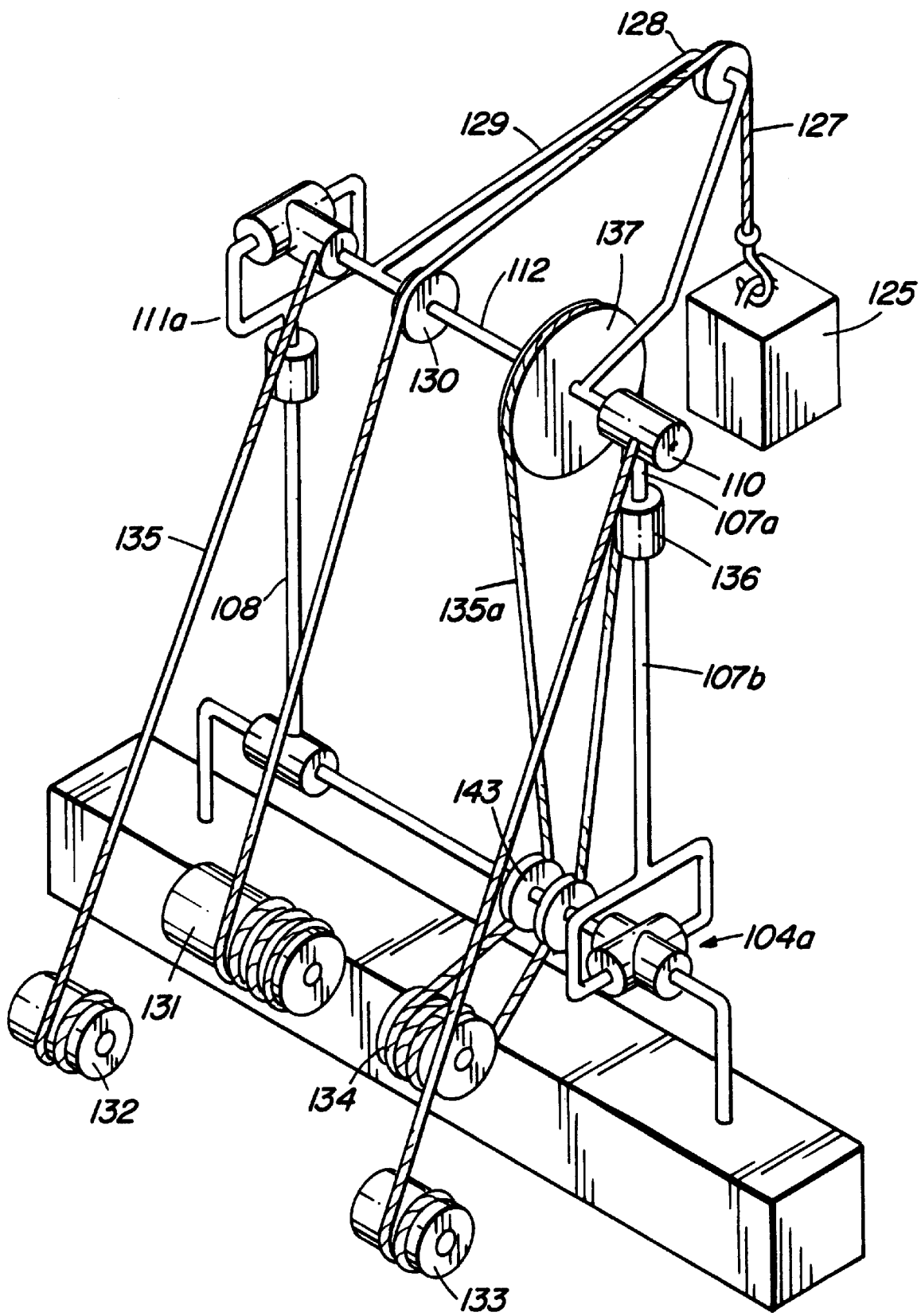
FIG. 16 is a perspective view of the positional mechanism of the invention employed as a crane for lifting a heavy load.

A practical application of the mechanism is shown in FIG. 16 wherein a load 125 is being lifted by a hook 126 at the end of a cable 127. The cable 127 passes over the outer end 128 of a triangular extension 129 to the elevated link 112. A stand-off strut or pulley 130 journalled for rotation about elevated link 112, dresses the cable 127 as it passes back to a cable capstan 131. This cable capstan 131 is not strictly required, as a range of motion suited to a crane is possible by manipulating the hook 126 fixed to the outer end 128 of the extension 129 by means of orienting capstans 132, 133, 134 connected by cables 135 to the appropriate elements of the mechanism. However, its presence adds versatility to the mechanism.

In FIG. 16, the first spherical joint 104a is of a modified "transposed" spherical form wherein one of the contained revolute joints 136 has been displaced to a position adjacent the cylindrical joint 110 creating an alternate oriented link 107b. The actual oriented link 107a remains present in the juncture between the displaced revolute joint 136 and the cylindrical joint 110. The operation of the mechanism is, however, unchanged.

The two positional capstans 132, 133 govern the orientations of the oriented links 107a, 108, and a third capstan 134 controls the orientation of the elevated link 112 through an elevated a pulley 137 and returning cable 135a. The weight of the load 125 obviates the need for return cables on the positional capstans 132, 133. If the cable 127 and cable capstan 131 are present, then the third capstan 134 and elevated pulley 137 are not strictly required.

Figure 17:
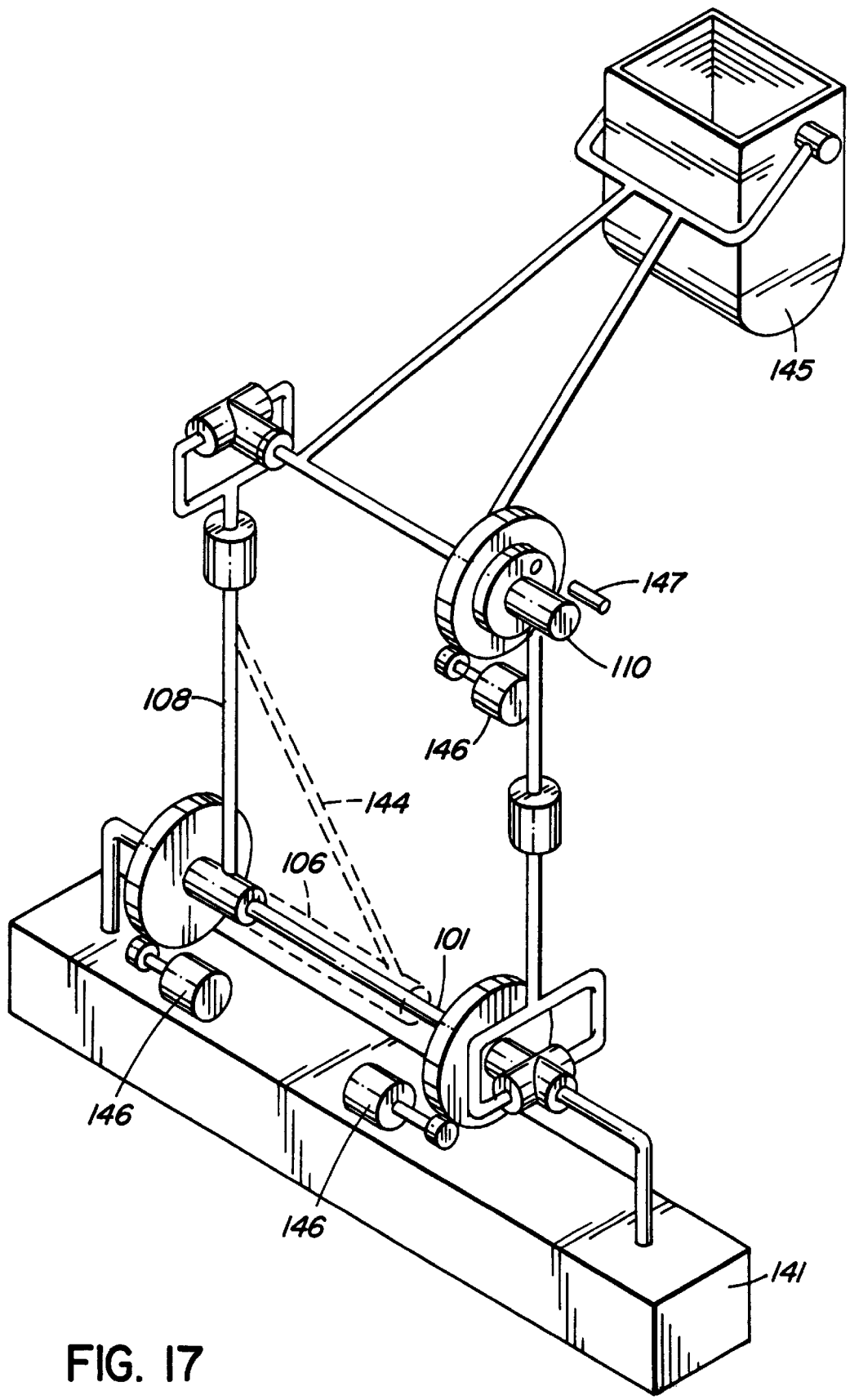
FIG. 17 is a depiction of the positional mechanism of the invention equipped with a compartment to contain a person as, for example, to pick fruit.

FIG. 17 depicts a lifting bucket 145 suited to carry an individual to an elevated location. In this variant, electric motors 146 actuate the joints of the mechanism. An optional pin 147 can be used to lock joint.

In FIG. 17 an improved form of orienting link 108 is shown sitting on a base 141. This improved link 144, shown partially in ghost form is triangular in form incorporating a diagonal brace 144 extends from the base link 101 to which it is journalled by a cylindrical joint 106 up to the upper end of the second oriented link 108 to which it is affixed. With this diagonal brace present stiffness is added to link 108 and joint 106.

"Combination of Orienting And Positional Mechanisms"

Figure 18:
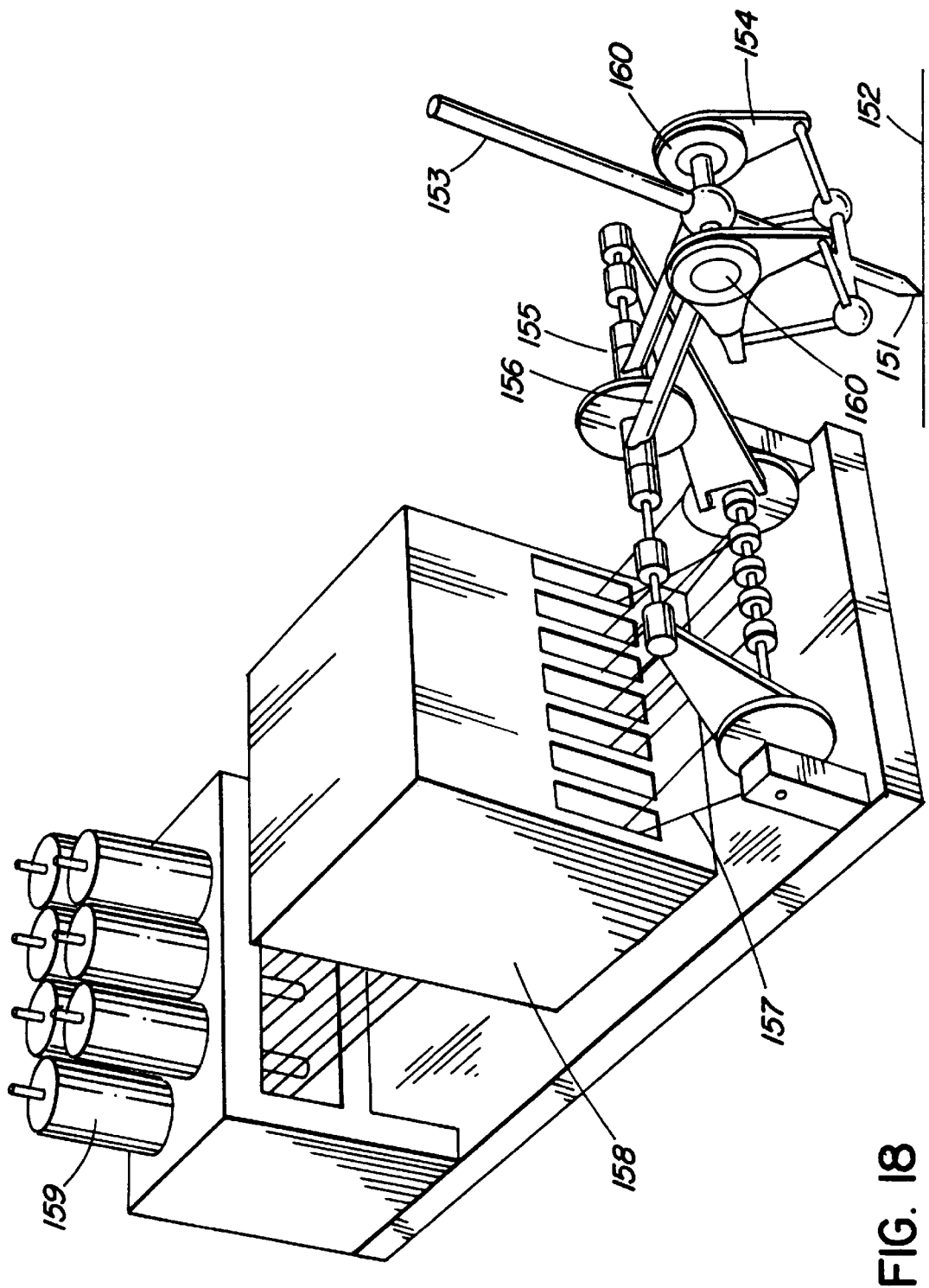
FIG. 18 is a pictorial view of the tendon activated mechanism wherein a handle or writing instrument is the end element within the orienting dual 5-bar mechanism of the invention being, in turn, carried by the positional mechanism of the invention and equipped with tendons linked to sensors and actuators.

As a demonstration of how the orienting and positional mechanisms of the invention can be combined, FIG. 18 depicts a mechanism for sensing the position of a pencil point 151 on a surface 152. A pencil 153 is seated in a dual 5-bar mechanism 154 of the type described previously. This orienting mechanism is, in turn, carried by the positional mechanism of the invention 155 supported by an extension arm 156, bifurcated for strength. Tendons 157 lead through tensioning sensing devices 158 to electrical rotary actuators 159. These tendons all operate on a returning basis.

Motion of the pencil 153 on the surface 152 therefore, produces an electrical signal from the sensors 158, and optionally from sensors 160 which may be located within the dual 5-bar assembly 154, which may be used to drive a suitable remote mechanism (not shown), possibly identical, wherein it is caused to track these signals by means of its actuators. By this means, the motion of the pencil point 151 may be duplicated in a remote location with high precision by a servo-controlled output pencil. Conversely, torques developed in the joints at the remote location due to resistance to pencil movement can be sensed by the remote device. Resistance developed at the output pencil can be transmitted back from the remote location to the originating user to provide feedback through combination actuator/sensors. Combining these two modes of operation, a bilateral communication may be established.

Instead of a pencil, a delicate instrument, such as a scalpel may be substituted. Because of the light weights and low inertia of the various components of the over-all invention, a high frequency response can be achieved.

Figure 19:
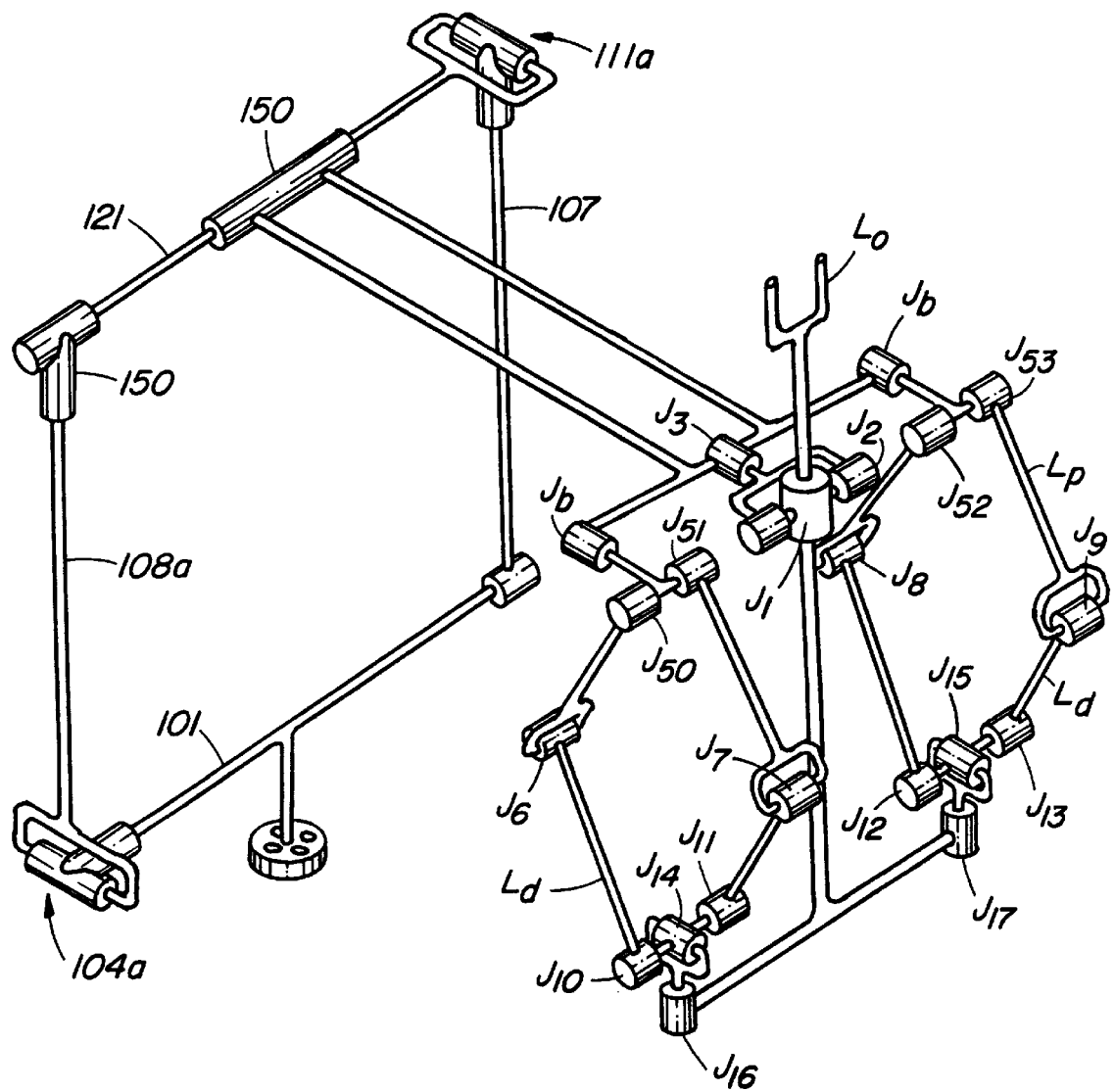
FIG. 19 is a depiction of the combined mechanisms of FIG. 1 and a variant of FIG. 14 with transposed spherical joints.

FIG. 19 shows the combination of a modified version of positional mechanism of FIG. 14 with the orienting mechanism of FIG. 1. The positional mechanism portion is modified by the presence of transposed revolute joints 150 for the spherical joints 104a, 111a. Thus, link 108a serves as a surrogate for orienting link 108.

In the orienting mechanism, the joints J50, J51, J52, J53 are equivalent to M1, M2, M3, M4 except they are not activated. Otherwise the elements correspond as labelled.

Figure 20:
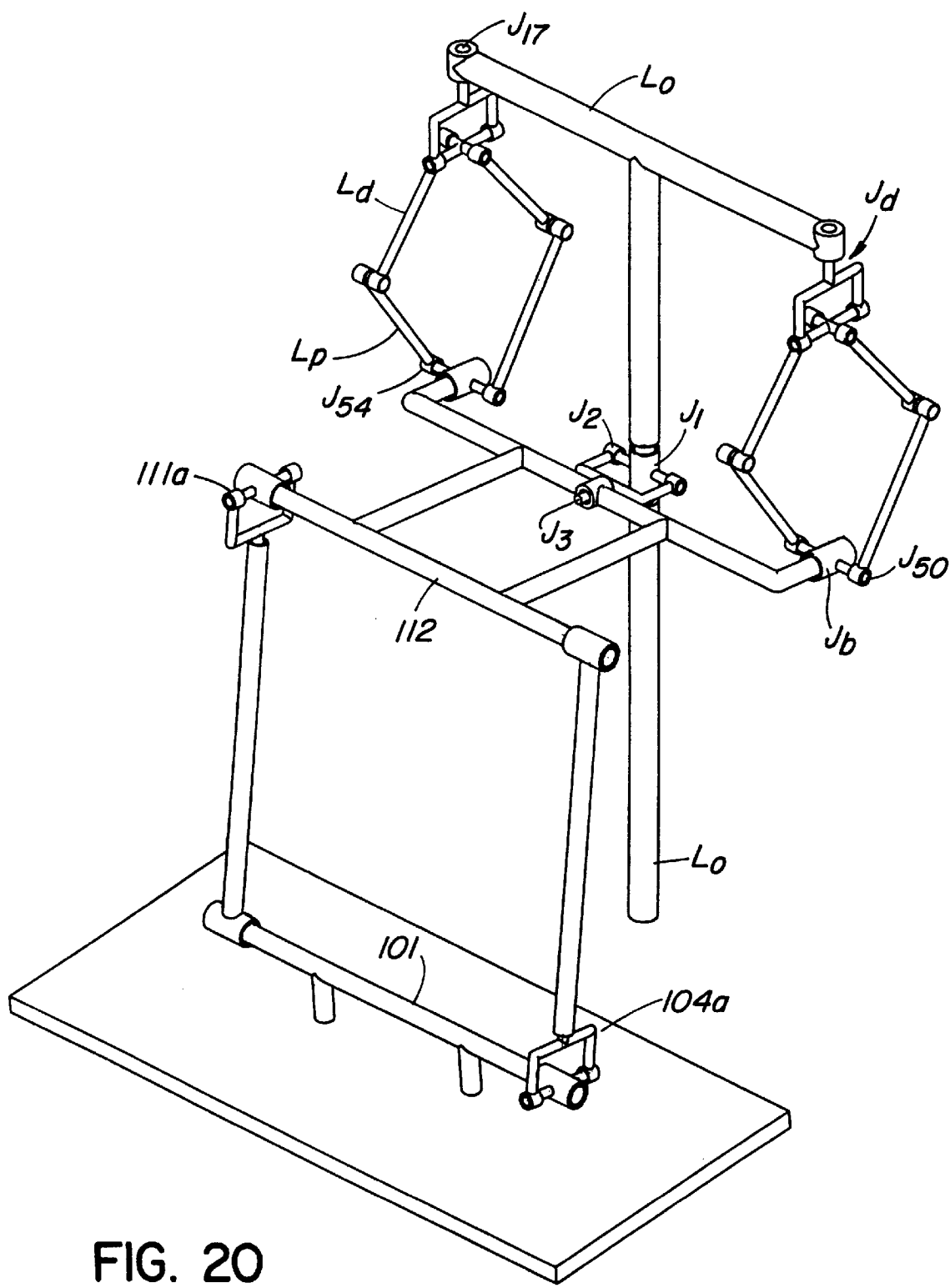
FIG. 20 is a pictorial depiction of a prototype of the combined positional and orientational mechanism portions of the mechanism built to evaluate its characteristics.

A pictorial depiction of a mechanical model actually built to verify the actions of the combined positional and orienting mechanisms of the invention is shown in FIG. 20. This figure shows a model of the elements of the combined mechanism used to verify its workspace and behaviour. It is labelled in the same manner as FIG. 19.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property is claimed is as follows:

1. An actuable mechanism for orienting an end member with respect to a base, the end member being constrained by a fixed support joint having at least two rotational degrees of freedom and a center of rotation for said at least two rotational degrees of freedom, said mechanism being characterized by two 5-bar linkages each defining a closed loop and having:

(a) a base link with two ends, said base link being connected to the base through a revolute joint;

(b) first and second proximal links connected respectively to the ends of the base link;

(c) a driven joint positioned opposite to said base link and joined thereto by first and second distal links which are respectively coupled through said proximal links to said base link; and (d) first and second actuated joints positioned within said closed loop between said base link and said driven joint for displacing the driven joint with respect to the base link, wherein the actuated joints of each of said 5-bar linkages are connected to the end member through said driven joints by connectors respectively located at connection points on said end member, said driven joints having at least two degrees of rotational freedom, said connection points being non-coincident with the center of rotation for the support joint, thereby to provide mobility to the end member with respect to said base in response to said actuators joints.

2. A mechanism as in claim 1 characterized in that said first and second actuated joints are rotational joints positioned respectively between the ends of the base link and the driven joint.

3. A mechanism as in claim 1 characterized in that said first and second actuated joints are rotational joints positioned respectively at the ends of the base link, between such ends and the respective proximal links.

4. A mechanism as in claim 1 characterized in that said first and second actuated joints are sliding joints positioned respectively between the proximal and distal links.

5. A mechanism as in claim 1 characterized in that the said driven joints each comprise three revolute joints, two of which joints have coinciding axes and are connected to the distal links, all of said joints having a common center of rotation.

6. A mechanism as in claim 1 characterized in that the said driven joints each comprise four revolute joints, the first and second of which are respectively connected to distal links having coinciding axes, all of the axes of said joints having a common center of rotation.

7. A mechanism as in claim 1 wherein the support joint is carried by the base and further comprising a cylindrical joint positioned between the end member and the base.

8. A mechanism as in claim 1, characterized by said support joint having only two degrees of rotational freedom.

9. A mechanism as in claim 1, characterized by said support joint having three degrees of rotational freedom.

10. The mechanism of claim 1 in combination with an actuable positioning mechanism for effecting displacement of the mechanism of claim 1 as an elevated member characterized by a linkage having four positional joints and four positional links wherein:

(a) three of the four positional links comprise:
  (i) one base positional link having two ends; and
  (ii) first and second oriented links each having base and elevated ends and being coupled at their base ends to the respective ends of the base positional link through the first and second positional joints respectively;

(b) the first positional joint permits orientation of the first oriented link about a center of rotation;

(c) third and fourth positional joints are located at the elevated ends of the first and second oriented links respectively.

(d) the second and third, positional joints are revolute, each permitting rotation about one axis and having respective axes which are non-orthogonal to each other; and (e) the fourth positional link comprises an elevated link supported at its two ends respectively through said third and fourth positional joints by the first and second oriented links, whereby the end of the elevated link at the third positional joint is constrained to move about the first positional joint in a path which lies on a sphere centered at the first positional joint, and the end of the elevated link at the fourth positional joint is constrained to move in a path which is circular about the second positional joint, said positioning mechanism further comprising first, second and third positional actuators for orienting the first, and second oriented links and the elevated link:

(i) the first positional actuator being coupled on one side thereof to the base positional link, and coupled on its other side to the first oriented link in order to effect orientation of the first oriented link about an axis which is non-orthogonal to the axis of rotation of the second joint;

(ii) the second positional actuator being coupled on one side thereof to the base positional link and coupled on its other side to the second oriented link to effect orientation of such second oriented link;

(iii) the third positional actuator being connected between the base positional link and elevated link to orient the elevated link with respect to the base positional link, whereby the positional actuators may collectively position and orient the elevated member within a work space, providing a combined mechanism with three degrees of translational freedom and two or three degrees of rotational freedom.

11. The combined mechanism of claim 10 characterized in that the axis of the second positional joint intersects the center of rotation of the first positional joint.

12. The combined mechanism of claim 10 characterized in that the axis of the third positional joint intersects the center of rotation of the fourth positional joint.

13. The combined mechanism of claim 10 characterized in that the distance from the center of rotation of the first positional joint to the axis of the third positional joint is substantially equal to the distance from the center of rotation of the fourth positional joint to the axis of rotation of the second positional joint.

14. An actuable mechanism for orienting an end member with respect to a base, the end member being constrained by a fixed support joint having at least two rotational degrees of freedom and a center of rotation for said at least two rotational degrees of, freedom, said mechanism being characterized by two 5-bar linkages each defining a closed loop and each being;

(a) supported by the base through a revolute base joint to which said 5-bar linkage is connected;

(b) connected to the end member at a driven joint located remotely from the connection of the base joint to the 5-bar linkage, the driven joint being displaced from the support joint and having two degrees of rotational freedom, each of the 5-bar linkages further being provided with first and second actuated joints positioned within said closed loop between the base joint and the driven joint to provide mobility to the end member with respect to the base in response to such actuated joints.

* * * * *